(12) United States Patent
Fujinawa et al.

(10) Patent No.: US 7,043,332 B1
(45) Date of Patent: May 9, 2006

(54) NUMERIC CONTROL LATHE AND METHOD FOR CONTROLLING THE SAME

(75) Inventors: Tadashi Fujinawa, Sakado (JP); Toshio Ishimura, Kawagoe (JP)

(73) Assignee: Citizen Watch Co., Ltd., Tokyo (JP)

( * ) Notice: Subject to any disclaimer, the term of this patent is extended or adjusted under 35 U.S.C. 154(b) by 268 days.

(21) Appl. No.: 10/381,192

(22) PCT Filed: Sep. 22, 2000

(86) PCT No.: PCT/JP00/06534

§ 371 (c)(1),
(2), (4) Date: Mar. 21, 2003

(87) PCT Pub. No.: WO02/25388

PCT Pub. Date: Mar. 28, 2002

(51) Int. Cl.
*G06F 19/00* (2006.01)

(52) U.S. Cl. .................... 700/186; 700/159
(58) Field of Classification Search ........ 700/179–182, 700/186

See application file for complete search history.

(56) References Cited

U.S. PATENT DOCUMENTS

| | | | | |
|---|---|---|---|---|
| 5,013,989 A | * | 5/1991 | Kurakake et al. | 318/625 |
| 5,140,237 A | * | 8/1992 | Sasaki et al. | 318/568.11 |
| 5,173,648 A | * | 12/1992 | Kawamura et al. | 318/568.13 |
| 5,270,941 A | * | 12/1993 | Hanaki et al. | 700/193 |
| 5,977,736 A | * | 11/1999 | Nakazato | 318/568.17 |
| 6,742,422 B1 | * | 6/2004 | Shinohara et al. | 82/1.11 |

FOREIGN PATENT DOCUMENTS

| | | |
|---|---|---|
| JP | 8-118200 | 5/1996 |
| JP | 9-73308 | 3/1997 |
| JP | 10-86040 | 4/1998 |
| JP | 10-315005 | 12/1998 |
| JP | 2000-122709 | 4/2000 |

* cited by examiner

*Primary Examiner*—Leo Picard
*Assistant Examiner*—Ryan A. Jarrett
(74) *Attorney, Agent, or Firm*—Finnegan, Henderson, Farabow, Garrett & Dunner, L.L.P.

(57) ABSTRACT

A numerically controlled lathe (10) includes a control unit (24) for controlling the operations of at least one spindle (14, 16) and at least one tool rest (18, 20) on a lathe bed (12) along a plurality of control axes in a plurality of lines. The control unit (24) has an input section (100) for inputting a plurality of machining programs about a plurality of tools (22) mounted on at least one tool rest, a storage section (112) having a plurality of program-describing areas ($1, $2, $3) corresponding to the lines for describing and storing the machining programs input by the input section in the program-describing areas, and a processing section (116) for allocating the control axes to the program-describing areas in the storage section, each control axes being as a reference control axis, and for applying, to an actual control axis for controlling a machining operation relating to one designated tool designated in each machining program, the reference control axis allocated to a program-describing area freely selected from the program-describing areas to describe a machining program designating the designated tool.

27 Claims, 10 Drawing Sheets

```
        $1              $2              $3

T2100 Z1       ⎫
    G0 Z-1.0       ⎬ P1
    G1 Z2.7 F0.08  ⎭
    G0 Z-1.0

!3L3                           !1L3
    T0200                          T3100 K2   ⎫
    G0 X8.06 Z-0.5                 G0 Z-1.0   ⎬ P3
    G1 X10.0 Z5.0 F0.03            G1 Z2.8 F0.05 ⎭
    Z20.0 F0.05                    G0 Z-1.0
    G4 U0.2        ⎫ P2
    X14.845        ⎬
    X16.0 Z21.0 F0.03
    Z50.0 F0.1
    X17.0          ⎭

T0100          ⎫
    G0 X17.0 Z50.0 ⎬ P4
    G1 X-1.0 F0.02 ⎭
    X-3.0 F0.05
```

NUMERIC CONTROL LATHE AND METHOD FOR CONTROLLING THE SAME

TECHNICAL FIELD

The present invention relates to a multifunction type numerically controlled lathe including at least one spindle and at least one tool rest, which are operable under control in a plurality of paths or lines, and also to a control unit built into this numerically controlled lathe. Further, the present invention relates to a controlling method and a program-describing method of such a numerically controlled lathe.

BACKGROUND ART

In recent years, in the field of automatic lathes (that is, lathes able to perform automatic machining) such as numerical control lathes (hereinafter called "NC lathes"), to enable machining of much more complicatedly shaped workpieces from a bar-shaped worked material (hereinafter called a "bar"), compound or combination machining where a large number of types of tools including rotary tools are provided on a tool rest to enable diverse automatic machining such as milling in addition to turning is being promoted. Further, to shorten the machining time, various multifunction type NC lathes carrying at least one spindle and at least one tool rest, which are operable under control in a plurality of paths or lines, close together on a single lathe bed, and capable of performing different types of machining (for example, outer circumferential turning and boring) simultaneously on the same bar or simultaneous machining on different bars have been proposed. Note that the term "line" means a combination of a group of control axes for control by a single machining program (including case of using only one control axis). When a plurality of types of combinations of such groups of control axes can be set on a single NC machine tool, the control system performed in this NC machine tool is generally called "multi-line control (or multi-path control)".

As this type of multifunction type NC lathe, for example, there is known one provided with a main (or front) first spindle rotating while holding a bar supplied from outside the lathe, an auxiliary (or back) second spindle rotating while holding a partially machined bar received from the first spindle, and independently operating first and second tool rests equipped with pluralities of tools (for example, see Japanese Unexamined Patent Publication (Kokai) No. 10-315005 (JP10-315005A)). In this known NC lathe, the first spindle, second spindle, first tool rest, and second tool rest operate under control of two lines as explained later. Due to this, diverse automatic machining including simultaneous machining is performed.

Explaining this in more detail, the first spindle is configured to move linearly along a feed control axis (here, called the "Z1-axis") parallel to its own axis of rotation. On the other hand, the first tool rest is configured to be located retracted to the side in the front of the first spindle in the axial direction and to move linearly along a feed control axis (here, called the "X1-axis") perpendicular to the Z1-axis of the first spindle. The first tool rest is a so-called combtooth or gang tool rest holding a plurality of tools in a parallel arrangement and can mount a plurality of turning tools (or single point tools) in an arrangement enabling positioning perpendicular to the axis of rotation of the first spindle. Therefore, the first tool rest is capable of moving by interpolation the nose of a desired tool selected by indexing in accordance with an NC program by co-action between X1-axis motion of the first tool rest itself and Z1-axis motion of the first spindle controlled in the first line. Due to this, the bar held in the first spindle is machined to the desired shape.

The first tool rest further has a feed control axis (here, called the "Y1-axis") perpendicular to both the Z1-axis and X1-axis. The Y1-axis motion of the first tool rest is motion to select the desired tool, and also functions, for example, as motion for cutting the outer circumference of the bar when selecting a rotary tool. Further, the first tool rest may have mounted to it additional tools in a combtooth manner at other positions for selection by X1-axis motion and motion by interpolation by Y1-axis motion.

The second tool rest is located away from the first tool rest in front of the first spindle in the axial direction. The second tool rest is a rocking type tool rest holding a plurality of tools in an arc arrangement centered on a rotation indexing control axis (here, called the "I-axis") parallel to the Z1-axis of the first spindle and can mount at the front holding portion drills or other drilling tools in an arrangement enabling positioning coaxially with the axis of rotation of the first spindle. Therefore, the second tool rest is capable of moving relatively linearly the nose of a desired tool selected at the front holding portion by I-axis rotation in accordance with an NC program by Z1-axis motion of the first spindle controlled by the first line identical to the control line of the first tool rest for example. Due to this, the bar held in the first spindle is machined to be drilled in its end face.

The second tool rest further is capable of mounting similar drilling tools at a back holding portion at the opposite side to the front holding portion at the same positions as the plurality of tools for machining the bar held in the first spindle, coaxially but oriented in the opposite direction, to enable machining of a bar held in the second spindle. As opposed to this, the second spindle is configured having an axis of rotation parallel to the axis of rotation of the first spindle, located facing it coaxially in front of the first spindle in the axial direction, and moving linearly along a feed control axis (here, called the "Z2-axis") parallel to the Z1-axis of the first spindle. Therefore, the second tool rest can move relatively linearly the nose of a desired tool mounted in the back holding portion in accordance with an NC program by Z2-axis motion of the second spindle controlled by a second line different from the first line. Due to this, end face drilling is performed on the bar held in the second spindle.

In this way, the above known NC lathe can control the motion of the spindles and tool rests along four feed control axes in two lines, in accordance with an NC program to simultaneously use as much as three tools selected on the two tool rests to automatically machine bars held at the two or front and back spindles.

In the above type of multifunction NC lathe, the respective operations of the spindles and the tool rests are normally controlled in accordance with respective machining programs input to a control unit (hereinafter called an "NC unit"), the programs being classified into lines to which they can belong. As an example, in the above-described NC lathe having two spindles and two tool rests, the data for machining a bar held in the first spindle by a tool mounted in the first tool rest is input as a machining program of a line-1 for controlling the X1-axis, Y1-axis and Z1-axis, the data for machining a bar held in the first spindle by a tool mounted in the front holding portion of the second tool rest is input as a machining program of the line-1 for controlling only the Z1-axis, and the data for machining a bar held in the second spindle by a tool mounted in the back holding portion of the second tool rest is input as a machining program of a line-2 for controlling only the Z2-axis. When manually inputting these data to the NC unit through a control panel (i.e., a manual data input), a display screen of the control panel generally displays the machining programs of the different lines as respective compact strings of blocks, in a plurality of program-describing areas provided serially or in parallel on the screen to be classified into the different lines.

In the past, manufacturers of multifunction type NC lathes have generally prepared software for NC units so that the above plurality of program-describing areas provided on the display screen of the control panel could only describe machining programs using control axes determined in advance corresponding respectively to the program-describing areas. Therefore, when for example a user input machining programs in the above two-line NC lathe, general practice had been for the machining programs by tools mounted in the first tool rest to be described in the program-describing area corresponding to the line-1, for the machining programs by tools mounted in the front holding portion of the second tool rest to be described in the same program-describing area corresponding to the line-1, and for the machining programs by tools mounted in the back holding portion of the second tool rest to be described in another program-describing area corresponding to the line-2. As a result, when inputting a machining program while checking the display screen of the control panel, the user had to first obtain an accurate grasp of the temporal relationship of the various types of control operations between different lines, that is, which is first or later or if they are simultaneous, then write them in the program-describing areas corresponding to the respective lines. As a result, an accurate understanding of the entire multifunction machining process and sufficient knowledge about the multi-line describing method has been required. Further, in this case, some NC units use specific codes for matching the timing of control among lines, so there was a tendency for the time for execution of a machining program (that is, the machining time) to become longer by the amount of the blocks describing these codes, the input work to become complicated, and input errors due to descriptive omissions to easily occur.

Further, in a conventional multifunction type NC lathe, when having a mechanical configuration enabling machining under control in several different lines for machining a bar held in one spindle, the lathe manufacturer generally prepared software for the NC unit so as to limit the line (or the combination of control axes) for controlling such a machining operation to a single line in advance. Therefore, the user was not given the freedom to select the line for control of the machining operation in that case. Further, in the case of control by superposition of axes in a conventional multifunction type NC lathe, the software of general NC units was prepared using specific codes for instructing the start and end of the superposition control, so there was a tendency for the time for execution of a machining program (that is, the machining time) to become longer by the amount of the blocks describing these codes, the input work to become complicated, and input errors due to descriptive omissions to easily occur.

Japanese Unexamined Patent Publication (Kokai) No. 2000-122709 (JP2000-122709A) discloses a method of describing multi-line machining programs in a multifunction type NC lathe. The method of describing disclosed in this publication enables simultaneous machining programs of two lines, classified and described into two program-describing areas in the past, to be described serially consecutively in a single program-describing area by use of specific codes (G185 and G186). This prior art, however, does not solve the various problems explained above occurring when a user prepares multi-line machining programs.

DISCLOSURE OF THE INVENTION

Therefore, an object of the present invention is to provide a multifunction type NC lathe having a plurality of lines, improved in freedom of describing routine when a user prepares multi-line machining programs.

Another object of the present invention is to provide a multifunction type NC lathe having a plurality of lines, able to facilitate the input work and eliminate input errors when a user prepares multi-line machining programs and able to shorten the time for execution of the prepared machining programs (that is, the machining time).

A still further object of the present invention is to provide an NC unit built into such an NC lathe and facilitating the preparation of multi-line machining programs.

A still further object of the present invention is to provide a method of control and a method of program-describing, of an NC lathe having such an NC unit built into it.

To achieve the above objects, the present invention provides a numerically controlled lathe comprising a lathe bed; at least one spindle installed on the lathe bed; at least one tool rest installed on the lathe bed; and a control unit for controlling operations of the at least one spindle and the at least one tool rest on the lathe bed along a plurality of control axes in a plurality of lines; wherein the control unit comprises an input section for inputting a plurality of machining programs about a plurality of tools mounted in the at least one tool rest; a storage section including a plurality of program-describing areas individually corresponding to the plurality of lines, for describing and storing the plurality of machining programs input by the input section in the plurality of program-describing areas; and a processing section for allocating the plurality of control axes to the plurality of program-describing areas in the storage section, each of the control axes being as a reference control axis, and for applying, to an actual control axis for controlling a machining operation relating to one designated tool designated in each of the plurality of machining programs, the reference control axis allocated to a program-describing area freely selected from the plurality of program-describing areas to describe a machining program designating the designated tool.

Preferably, the processing section of the control unit reads a tool function command designating the designated tool in the machining program described in the program-describing area as freely selected, and decides whether the machining operation relating to the designated tool is controllable by the reference control axis as applied.

In this case, preferably, when deciding that the machining operation relating to the designated tool is not controllable by the reference control axis as applied, the processing section of the control unit applies, to the actual control axis, a control axis capable of controlling the machining operation relating to the designated tool among the plurality of control axes other than the reference control axis allocated to the program-describing area as freely selected.

More preferably, the processing section of the control unit follows an axis designation command designating the actual control axis in the machining program described in the program-describing area as freely selected, and uses the actual control axis as designated, instead of the reference control axis as applied.

In this case, it is advantageous that a tool function command designating the designated tool and the axis designation command are described together in an identical block in the machining program described in the program-describing area as freely selected.

More preferably, the processing section of the control unit determines the actual control axis in accordance with an axis superposition command for superposing a desired one of the control axes on another desired one of the control axes, described together with a tool function command designating the designated tool in an identical block, in the machining program described in the program-describing area as freely selected.

More preferably, the processing section of the control unit processes a plurality of machining program about a plurality of tools, described in series in the program-describing area as freely selected, in such a manner as to perform the programs in an order matching describing order of the programs.

The present invention further provides a numerical controlled lathe comprising a lathe bed; at least one spindle installed on the lathe bed; at least one tool rest installed on the lathe bed; and a control unit for controlling operations of the at least one spindle and the at least one tool rest on the lathe bed along a plurality of control axes in a plurality of lines; wherein the control unit comprises an input section for inputting a plurality of machining programs about a plurality of tools mounted in the at least one tool rest; a storage section including a plurality of program-describing areas individually corresponding to the plurality of lines, for describing and storing the plurality of machining programs input by the input section in the plurality of program-describing areas; and a processing section for determining an actual control axis for controlling a machining operation relating to one designated tool designated in each of the plurality of machining programs, in accordance with an axis designation command designating the actual control axis in a machining program designating the designated tool.

In this numerically controlled lathe, it is advantageous that the axis designation command is described together with a tool function command designating the designated tool in an identical block in the machining program.

The present invention further provides a numerical controlled lathe comprising a lathe bed; at least one spindle installed on the lathe bed; at least one tool rest installed on the lathe bed; and a control unit for controlling operations of the at least one spindle and the at least one tool rest on the lathe bed along a plurality of control axes in a plurality of lines; wherein the control unit comprises an input section for inputting a plurality of machining programs about a plurality of tools mounted in the at least one tool rest; a storage section including a plurality of program-describing areas individually corresponding to the plurality of lines, for describing and storing the plurality of machining programs input by the input section in the plurality of program-describing areas; and a processing section for determining an actual control axis for controlling a machining operation relating to one designated tool designated in each of the plurality of machining programs, in accordance with an axis superposition command for superposing a desired one of the control axes on another desired one of the control axes, described together with a tool function command designating the designated tool in an identical block, in a machining program designating the designated tool.

The present invention further provides a control unit for use in a numerically controlled lathe having a plurality of lines including a plurality of control axes, comprising an input section for inputting a plurality of machining programs about a plurality of tools provided in the numerically controlled lathe; a storage section including a plurality of program-describing areas individually corresponding to the plurality of lines, for describing and storing the plurality of machining programs input by the input section in the plurality of program-describing areas; and a processing section for allocating the plurality of control axes to the plurality of program-describing areas in the storage section, each of the control axes being as a reference control axis, and for applying, to an actual control axis for controlling a machining operation relating to one designated tool designated in each of the plurality of machining programs, the reference control axis allocated to a program-describing area freely selected from the plurality of program-describing areas to describe a machining program designating the designated tool.

Preferably, the processing section reads a tool function command designating the designated tool in the machining program described in the program-describing area as freely selected, and decides whether the machining operation relating to the designated tool is controllable by the reference control axis as applied.

In this state, preferably, when deciding that the machining operation relating to the designated tool is not controllable by the reference control axis as applied, the processing section applies, to the actual control axis, a control axis capable of controlling the machining operation relating to the designated tool among the plurality of control axes other than the reference control axis allocated to the program-describing area as freely selected.

More preferably, the processing section follows an axis designation command designating the actual control axis in the machining program described in the program-describing area as freely selected, and uses the actual control axis as designated, instead of the reference control axis as applied.

In this case, it is advantageous that a tool function command designating the designated tool and the axis designation command are described together in an identical block in the machining program described in the program-describing area as freely selected.

More preferably, the processing section determines the actual control axis in accordance with an axis superposition command for superposing a desired one of the control axes on another desired one of the control axes, described together with a tool function command designating the designated tool in an identical block, in the machining program described in the program-describing area as freely selected.

More preferably, the processing section processes a plurality of machining programs about a plurality of tools, described in series in the program-describing area as freely selected, in such a manner as to perform the programs in an order matching a describing order of the programs.

The present invention further provides a control unit for use in a numerically controlled lathe having a plurality of lines including a plurality of control axes, comprising an input section for inputting a plurality of machining programs about a plurality of tools provided in the numerically controlled lathe; a storage section including a plurality of program-describing areas individually corresponding to the plurality of lines, for describing and storing the plurality of machining programs input by the input section in the plurality of program-describing areas; and a processing section for determining an actual control axis for controlling a machining operation relating to one designated tool designated in each of the plurality of machining programs, in accordance with an axis designation command designating the actual control axis in a machining program designating the designated tool.

In this control unit, it is advantageous that the axis designation command is described together with a tool function command designating the designated tool in an identical block in the machining program.

The present invention further provides a control unit for use in a numerically controlled lathe having a plurality of lines including a plurality of control axes, comprising an input section for inputting a plurality of machining programs about a plurality of tools provided in the numerically controlled lathe; a storage section including a plurality of program-describing areas individually corresponding to the plurality of lines, for describing and storing the plurality of machining programs input by the input section in the plurality of program-describing areas; and a processing section for determining an actual control axis for controlling a machining operation relating to one designated tool designated in each of the plurality of machining programs, in accordance with an axis superposition command for superposing a desired one of the control axes on another desired one of the control axes, described together with a tool function command designating the designated tool in an identical block, in a machining program designating the designated tool.

The present invention further provides a method of control of a numerically controlled lathe including at least one spindle and at least one tool rest, which are operable under control along a plurality of control axes in a plurality of lines, comprising providing a control unit comprising a storage section including a plurality of program-describing areas individually corresponding to the plurality of lines; allocating the plurality of control axes to the plurality of program-describing areas in the storage section of the control unit, each of the control axes being as a reference control axis; describing and storing each of a plurality of machining programs about a plurality of tools carried on the at least one tool rest, in a program-describing area freely selected from the plurality of program-describing areas in the storage section of the control unit; applying, to an actual control axis for controlling a machining operation relating to one designated tool designated in each of the plurality of machining programs, the reference control axis allocated to the program-describing area as freely selected to describe a machining program designating the designated tool; and controlling an operation of each of the at least one spindle and the at least one tool rest along the reference control axis applied to the actual control axis in each of the plurality of machining programs.

Preferably, the step of applying the reference control axis to the actual control axis includes reading a tool function command designating the designated tool in the machining program described in the program-describing area as freely selected, and deciding whether the machining operation relating to the designated tool is controllable by the reference control axis as applied.

In this case, it is preferred to include, when deciding that the machining operation relating to the designated tool is not controllable by the reference control axis as applied, applying, to the actual control axis, a control axis capable of controlling the machining operation relating to the designated tool among the plurality of control axes other than the reference control axis allocated to the program-describing area as freely selected.

More preferably, the step of applying the reference control axis to the actual control axis includes, in accordance with an axis designation command designating the actual control axis in the machining program described in the program-describing area as freely selected, using the actual control axis as designated, instead of the reference control axis as applied.

In this case, it is advantageous that a tool function command designating the designated tool and the axis designation command are described together in an identical block in the machining program described in the program-describing area as freely selected.

More preferably, the step of applying the reference control axis to the actual control axis includes determining the actual control axis in accordance with an axis superposition command for superposing a desired one of the control axes on another desired one of the control axes, described together with a tool function command designating the designated tool in an identical block, in the machining program described in the program-describing area as freely selected.

The present invention further provides a method of control of a numerically controlled lathe including at least one spindle and at least one tool rest, which are operable under control along a plurality of control axes in a plurality of lines, comprising providing a control unit comprising a storage section including a plurality of program-describing areas individually corresponding to the plurality of lines; describing and storing, respectively, a plurality of machining programs about a plurality of tools carried on the at least one tool rest, in the plurality of program-describing areas in the storage section of the control unit; determining an actual control axis for controlling a machining operation relating to one designated tool designated in each of the plurality of machining programs, in accordance with an axis designation command designating the actual control axis in a machining program designating the designated tool; and controlling an operation of each of the at least one spindle and the at least one tool rest along the actual control axis determined in each of the plurality of machining programs.

In this method of control, it is advantageous that the axis designation command is described together with a tool function command designating the designated tool in an identical block in the machining program.

The present invention further provides a method of control of a numerically controlled lathe including at least one spindle and at least one tool rest, which are operable under control along a plurality of control axes in a plurality of lines, comprising providing a control unit comprising a storage section including a plurality of program-describing areas individually corresponding to the plurality of lines; describing and storing, respectively, a plurality of machining programs about a plurality of tools carried on the at least one tool rest, in the plurality of program-describing areas in the storage section of the control unit; determining an actual control axis for controlling a machining operation relating to one designated tool designated in each of the plurality of machining programs, in accordance with an axis superposition command for superposing a desired one of the control axes on another desired one of the control axes, described together with a tool function command designating the designated tool in an identical block, in a machining program designating the designated tool; and controlling an operation of the at least one spindle and the at least one tool rest along the actual control axis determined in each of the plurality of machining programs.

The present invention further provides a method of describing of a machining program in a control unit in a numerically controlled lathe provided with a plurality of lines including a plurality of control axes, comprising setting a plurality of program-describing areas individually corresponding to the plurality of lines in a storage section of the control unit, the control axes being allocated to the plurality of program-describing areas, each of the control axes being as a reference control axis; and describing each of a plurality of machining programs about a plurality of tools, in connection with a program-describing area freely selected from the plurality of program-describing areas in the storage section of the control unit, by using a block format for applying the reference control axis, allocated to the program-describing area as freely selected, to an actual control axis for controlling a machining operation relating to one designated tool designated in each machining program.

Preferably, the block format includes a tool function command designating the designated tool.

More preferably, the block format includes an axis designation command for designating the actual control axis to be used instead of the reference control axis as specified.

In this case, it is advantageous that a tool function command designating the designated tool and the axis designation command are described together in an identical block.

More preferably, the block format includes an axis superposition command for superposing a desired one of the control axes on another desired one of the control axes, described together with a tool function command designating the designated tool in an identical block.

The present invention further provides a method of describing of a machining program in a control unit in a numerically controlled lathe provided with a plurality of lines including a plurality of control axes, comprising setting a plurality of program-describing areas individually corresponding to the plurality of lines in a storage section of the control unit; and describing each of a plurality of machining programs about a plurality of tools, in connection with the plurality of program-describing areas in the storage section of the control unit, by using a block format for determining an actual control axis for controlling a machining operation relating to one designated tool designated in each machining program, in accordance with an axis designation command for designating the actual control axis.

In this method of describing of machining programs, it is advantageous that the axis designation command is described together with a tool function command designating the designated tool in an identical block.

The present invention further provides a method of describing of a machining program in a control unit in a numerically controlled lathe provided with a plurality of lines including a plurality of control axes, comprising setting a plurality of program-describing areas individually corresponding to the plurality of lines in a storage section of the control unit; and describing each of a plurality of machining programs about a plurality of tools, in connection with the plurality of program-describing areas in the storage section of the control unit, by using a block format for determining an actual control axis for controlling a machining operation relating to one designated tool designated in each machining program, in accordance with an axis superposition command for superposing a desired one of the control axes on another desired one of the control axes, described together with a tool function command designating the designated tool in an identical block.

The present invention further provides a numerically controlled lathe comprising a lathe bed; a first spindle installed on the lathe bed, including a first axis of rotation, and movable under control along a first control axis in a first line; a first tool rest installed on the lathe bed and movable under control along a second control axis in the first line; a second tool rest installed on the lathe bed and movable under control along third and fourth control axes in a second line; a second spindle installed on the lathe bed, including a second axis of rotation parallel to the first axis of rotation, and movable under control along fifth and sixth control axes in a third line; and a control unit comprising a storage section including first, second, and third program-describing areas to which the first to sixth control axes are allocated, each of the control axes being as a reference control axis, the control unit capable of describing each of a plurality of machining programs about a plurality of tools carried on the first and second tool rests, in connection with a program-describing area freely selected from the first to third program-describing areas, by using a block format for applying, to an actual control axes for controlling a machining operation relating to one designated tool designated in each machining program, the reference control axis allocated to the program-describing area as freely selected.

In this numerically controlled lathe, the second tool rest is capable of holding the plurality of tools in parallel arrangements along a first row and a second row, exhibiting mutually different nose orientations.

BRIEF DESCRIPTION OF THE DRAWINGS

These and other objects, features, and advantages of the present invention will become clearer from the following description of the preferred embodiments given with reference to the attached drawings. In the attached drawings.

BEST MODE FOR CARRYING OUT THE INVENTION

Figure 1:
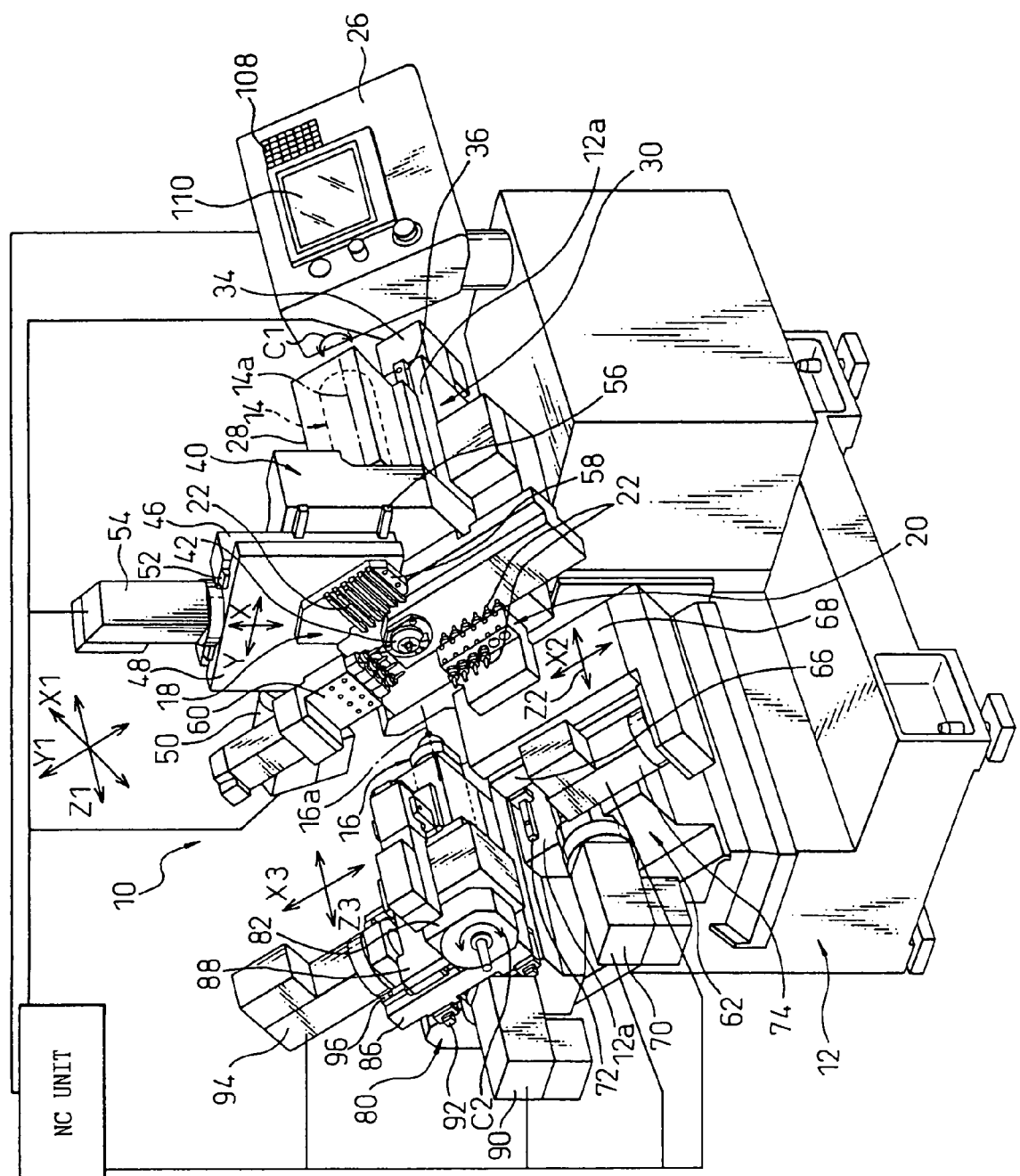
FIG. 1 is a perspective view of the overall configuration of an NC lathe according to an embodiment of the present invention.

Referring to the drawings, FIG. 1 shows the overall configuration of a numerically controlled (NC) lathe 10 according to an embodiment of the present invention. The NC lathe 10 has a three-line multifunction structure carrying close together on a single lathe bed 12 two spindles 14 and 16 and two tool rests 18 and 28, and capable of performing different types of machining (for example, outer circumferential turning and boring) simultaneously on the same bar or simultaneous machining on different bars by various tools 22 including single point tools, drills, and other turning tools or milling cutters and other rotary tools.

That is, the NC lathe 10 is basically provided with a lathe bed 12; a first spindle 14 installed on the lathe bed 12, including an axis of rotation 14a, and capable of operating under control in a first line (that is, a line-1); a first tool rest 18 installed on the lathe bed 12 and capable of operating under control in the line-1 common with the first spindle 14; a second tool rest 20 installed on the lathe bed 12 and capable of operating under control in a second line (that is, a line-2); and a second spindle 16 installed on the lathe bed 12, including an axis of rotation 16a parallel to the axis of rotation 14a of the first spindle 14, and capable of operating under control in a third line (that is, a line-3).

The lathe bed 12 has a so-called slant bed structure having a slanted guide surface 12a at the front of the bed and carries the first spindle 14, second spindle 16, first tool rest 18, and second tool rest 20 independently from each other to be able to slide in three rectangular coordinate systems based on the slanted guide surface 12a. The lathe bed 12 further carries a control panel 26 for operating a later explained control (NC) unit 24, a not shown cover, etc.

The first spindle 14 is a main (or front) spindle rotating while holding a bar W supplied from outside the lathe and is rotatably built into a first spindle stock 28 through a not shown bearing unit. The first spindle 14 has a hollow cylindrical structure and is provided at its front end region with a chuck (not shown) able to strongly hold the bar W supplied from the rear end side.

The first spindle stock 28 is slidably carried at a first spindle mount 30 provided at one end region of the lathe bed 12 in the longitudinal direction. The first spindle mount 30 is provided with a first spindle drive mechanism 32 (FIG. 2) for linearly moving the first spindle stock 28 along a first feed control axis (called the "Z1-axis") parallel to the slanted guide surface 12a and the axis of rotation 14a of the first spindle 14 in a rectangular three-axis coordinate system based on the slanted guide surface 12a of the lathe bed 12. The first spindle drive mechanism 32 is comprised of a Z1-drive (for example, an AC servomotor) 34 attached to the lathe bed 12, a Z1-guide member (for example, a slide guide) 36 attached to the slanted guide surface 12a, and a not shown feed screw (for example, a ball screw). Therefore, the first spindle 14 can move linearly reciprocatively together with the first spindle stock 28 along the first feed control axis (Z1-axis) parallel to its own axis of rotation 14a by the action of the first spindle drive mechanism 32.

The first spindle stock 28 further includes for example a built-in type AC servomotor as a rotation drive 38 (FIG. 2) for driving rotation of the first spindle 14. Further, the first spindle 14 can have a rotation angle control axis (called the "C1-axis") and can perform diverse machining using the rotary tools mounted at the desired tool rests 18 and 20, at desired positions on the end face or outer circumference of the bar W held in the chuck, by a positioning indexing motion of the C1-axis obtained by control of the rotation drive 38.

At the approximate center of the lathe bed 12 in the longitudinal direction is uprightly provided a column 40 adjacent to the first spindle mount 30. The column 40 is provided at a predetermined position away from the first spindle stock 28 in the front in the axial direction with a guide bush 42 serving as an auxiliary support supporting the bar W held in the first spindle 14 near the machined portion at its tip. The guide bush 42 is arranged coaxially with the first spindle 14 and centers and supports the bar W during turning so that the machined portion does not shake.

The first tool rest 18 is carried on the lathe bed 12 movable along the front surface of the column 40 functioning as the first tool rest mount and is arranged retracted to the side of the guide bush 42 positioned in front of the first spindle 14 in the axial direction. The column 40 is provided with a first tool rest drive mechanism 44 (FIG. 2) for linearly moving the first tool rest 18 along a second feed control axis (called the "X1-axis") perpendicular to the slanted guide surface 12a and the axis of rotation 14a (that is, the first feed control axis (Z1-axis)) of the first spindle 14 in a rectangular three-axis coordinate system based on the slanted guide surface 12a of the lathe bed 12.

The first tool rest drive mechanism 44 is provided with a Y-slide 46 carried on the front surface of the column 40 perpendicular to the slanted guide surface 12a of the lathe bed 12 slidably in the actual horizontal feed control axis (called the "Y-axis") direction perpendicular to the first feed control axis (Z1-axis), a Y-slide drive mechanism for moving the Y-slide 46 on the column 40 in the Y-axis direction, an X-slide 48 carried at the front surface of the Y-slide 46 parallel to the front surface of the column 40 slidably in the actual vertical feed control axis (called the "X-axis") direction perpendicular to both the first feed control axis (Z1-axis) and actual horizontal feed control axis (Y-axis), and an X-slide drive mechanism for moving the X-slide 48 on the Y-slide 46 in the X-axis direction. The Y-slide drive mechanism is comprised of a Y-drive (for example, an AC servomotor) 50 attached to the column 40, a Y-guide member (for example, a slide guide) 52 attached to the column front surface, and a not shown feed screw (for example, a ball screw). Similarly, the X-slide drive mechanism is comprised of an X-drive (for example, an AC servomotor) 54 attached to the Y-slide 46, an X-guide member (for example, a slide guide) 56 attached to the Y-slide front surface, and a not shown feed screw (for example, a ball screw). Therefore, the first tool rest 18 can move linearly reciprocatively along the second feed control axis (X1-axis) perpendicular to the first feed control axis (Z1-axis) by linear motion by interpolation by the Y-axis motion of the Y-slide 46 and X-axis motion of the X-slide 48 under the action of the first tool rest drive mechanism 44.

The first tool rest drive mechanism 44 linearly moves the first tool rest 18 further along a feed control axis (called the "Y1-axis") perpendicular to both of the first and second feed control axes (Z1-axis and X1-axis) in the rectangular three-axis coordinate system based on the slanted guide surface 12a of the lathe bed 12. This feed control axis (Y1-axis), like the second feed control axis (X1-axis), is realized by linear motion by interpolation by the Y-axis motion of the Y-slide 46 and X-axis motion of the X-slide 48 under the action of the first tool rest drive mechanism 44. Due to this, the first tool rest 18 can linearly and reciprocatively move along the Y1-axis.

The first tool rest 18 is a so-called combtooth or gang tool rest holding a plurality of tools 22 in a parallel arrangement and mounts single point tools, drills, and other turning tools or milling cutters and other rotary tools in an arrangement enabling positioning along a virtual plane parallel to the front surface of the column 40 and radially with respect to the axis of rotation 14a of the first spindle 14. In the illustrated embodiment, the first tool rest 18 is configured having a first holding portion 58 capable of holding a plurality of tools 22 in a parallel arrangement in a direction perpendicular to the second feed control axis (X1-axis), that is, in the Y1-axis direction, and a second holding portion 60 near the first holding portion 58 capable of holding a plurality of tools 22 in a parallel arrangement in the second feed control axis (X1-axis) direction.

Therefore, the first tool rest 18 is capable of moving by interpolation the nose of a desired tool 22, selected by indexing from the first holding portion 58 by Y1-axis motion, by co-action of X1-axis motion of the first tool rest 18 itself and Z1-axis motion of the first spindle 14 in accordance with a machining program of line-1 input to the NC unit 24. Similarly, the first tool rest 18 is capable of moving by interpolation the nose of a desired tool 22, selected by indexing from the second holding portion 60 by X1-axis motion, by co-action of Y1-axis motion of the first tool rest 18 itself and Z1-axis motion of the first spindle 14 in accordance with a machining program of line-1 input to the NC unit 24. Further, the first tool rest 18 is capable of moving by interpolation the nose of a rotary tool 22R mounted at the second holding portion 60, by co-action between X1-axis motion and Y1-axis motion of the first tool rest 18 itself in accordance with a machining program of line-1 input to the NC unit 24. In this way, the bar W held in the first spindle 14 can be machined to a desired shape by a desired tool 22 on the first tool rest 18 under the control of the line-1.

The second tool rest 20 is carried on the lathe bed 12 movably on a second tool rest mount 62 provided at the opposite side to the first spindle mount 30 across the column 40. The second tool rest mount 62 is provided with a second tool rest drive mechanism 64 (FIG. 2) for linearly moving the second tool rest 20 along a third feed control axis (called the "X2-axis") parallel to the slanted guide surface 12a and perpendicular to the axis of rotation 14a (that is, the first feed control axis (Z1)) of the first spindle 14 and a fourth feed control axis (called the "Z2-axis") parallel to the first feed control axis (Z1-axis) in a rectangular two-axis coordinate system based on the slanted guide surface 12a of the lathe bed 12.

The second tool rest drive mechanism 64 is provided with a Z2-slide 66 carried on the slanted guide surface 12a of the lathe bed 12 slidably in the fourth feed control axis (Z2-axis) direction, a Z2-slide drive mechanism for moving the Z2-slide 66 in the Z2-axis direction on the lathe bed 12, an X2-slide 68 carried on the front surface of the Z2-slide 66 parallel to the slanted guide surface 12a slidably in the third feed control axis (X2-axis) direction, and an X2-slide drive mechanism for moving the X2-slide 68 on the Z2-slide 66 in the X2-axis direction. The Z2-slide drive mechanism is comprised of a Z2-drive (for example, an AC servomotor) 70 attached to the lathe bed 12, a Z2-guide member (for example, a slide guide) 72 attached to the slanted guide surface 12a, and a not shown feed screw (for example, a ball screw). Similarly, the X2-slide drive mechanism is comprised of an X2-drive (for example, an AC servomotor) 74 attached to the Z2-slide 66, a not shown X2-guide member (for example, a slide guide) attached to the Z2-slide front surface a, and a not shown feed screw (for example, a ball screw). Therefore, the second tool rest 20 can move linearly and reciprocatively along the third feed control axis (X2-axis) and fourth feed control axis (Z2-axis) by the action of the second tool rest drive mechanism 64.

The second tool rest 20 is capable of holding a plurality of tools 22 in a combtooth manner in a first row and a second row, exhibiting mutually different nose orientations, and can mount single point tools, drills, and other turning tools or milling cutters and other rotary tools in an arrangement enabling positioning along a virtual plane parallel to the slanted guide surface 12a of the lathe bed 12 in parallel or coaxially with the axis of rotation 14a of the first spindle 14.

In the illustrated embodiment, the second tool rest 20 is comprised of a first holding portion 76 (FIG. 3) capable of orienting the plurality of tools 22 to face the column 40 carrying the first tool rest 16 and arranging them in parallel in the direction of the third feed control axis (X2-axis) to hold them in the first row, and a second holding portion 78, opposite to the first holding portion 76, capable of holding a plurality of tools 22 in the second row at the same positions as the plurality of tools 22 mounted at the first holding portion 76 oriented coaxially but in opposite directions. The tools 22 of the first row mounted at the first holding portion 76 of the second tool rest 20 have nose orientations for machining the bar W held in the first spindle 14. On the other hand, the tools 22 of the second row mounted at the second holding portion 78 of the second tool rest 20 have nose orientations for machining the bar W' (FIG. 3) held in the second spindle 16.

Therefore, the second tool rest 20 is capable of moving by interpolation the nose of a desired tool 22, selected by indexing from the first holding portion 76 by its own X2-axis motion, by co-action of X2-axis motion and Z2-axis motion of the second tool rest 20 itself according to a machining program of the line-2 input to the NC unit 24. Further, it is capable of moving the nose by superposing Z2-axis motion of the second tool rest 20 itself on Z1-axis motion of the first spindle 14 in accordance with a machining program of the line-2 input to the NC unit 24. In this way, it is possible to machine a bar W held in the first spindle 14 to a desired shape by a desired tool 22 selected from the first row of the second tool rest 20.

The spindle 16 is carried on the lathe bed 12 movably on a second spindle mount 80 provided adjacent to the second tool rest mount 62 at the opposite side to the first spindle mount 30 across the column 40, has an axis of rotation 16a parallel to the axis of rotation 14a of the first spindle 14, and is located to be able to face coaxially the first spindle 14, that is, the guide bush 42, in front in the axial direction. The second spindle 16 is an auxiliary (or back) spindle rotating while holding a partially machined bar W' received from the first spindle 14 and is rotatably built into a second spindle stock 82 through a not shown bearing device. The second spindle 16 has a hollow cylindrical structure and is provided at its front end region with a chuck (not shown) able to strongly hold the bar W' supplied from the facing guide bush 42.

The second spindle mount 80 is provided with a second spindle drive mechanism 84 (FIG. 2) for linearly moving the second spindle 16 along a fifth feed control axis (called the "X3-axis") parallel to the third feed control axis (X2-axis) of the second tool rest 20 and a sixth feed control axis (called the "Z3-axis") parallel to the first feed control axis (Z1-axis) of the first spindle 14 in a rectangular two-axis coordinate system based on the slanted guide surface 12a of the lathe bed 12.

The second spindle drive mechanism 84 is comprised of a Z3-slide 86 carried on the slanted guide surface 12a of the lathe bed 12 slidably in the sixth feed control axis (Z3-axis) direction, a Z3-slide drive mechanism for moving the Z3-slide 86 in the Z3-axis direction on the lathe bed 12, an X3-slide 88 carried on the front surface of the Z3-slide 86 parallel to the slanted guide surface 12a slidably in the fifth feed control axis (X3-axis) direction, and an X3-slide drive mechanism for moving the X3-slide 88 on the Z3-slide 86 in the X3-axis direction. The Z3-slide drive mechanism is comprised of a Z3-drive (for example, an AC servomotor) 90 attached to the lathe bed 12, a Z3-guide member (for example, a slide guide) 92 attached to the slanted guide surface 12a, and a not shown feed screw (for example, a ball screw). Similarly, the X3-slide drive mechanism is comprised of an X3-drive (for example, an AC servomotor) 94 attached to the Z3-slide 86, an X3-guide member (for example, a slide guide) 96 attached to the front surface of the Z3-slide, and a not shown feed screw (for example, a ball screw).

The second spindle stock 82 is secured to the front surface of the X3-slide 88 in a state with the axis of rotation 16a of the second spindle 16 arranged in parallel to the sixth feed control axis (Z3-axis). Therefore, the second spindle 16 can move linearly and reciprocatively along the fifth feed control axis (X3-axis) and sixth feed control axis (Z3-axis) by the action of the second spindle drive mechanism 84.

The second spindle stock 82 further includes for example a built-in type AC servomotor as a rotation drive 98 (FIG. 2) for driving rotation of the second spindle 16. Further, the second spindle 16 can have a rotation angle control axis (called the "C2-axis") and can perform diverse machining using a rotary tool mounted to the second tool rest 20 at a desired position on the end face or outer circumference of the bar W' held in the chuck by a positioning indexing motion of the C2-axis obtained by control of the rotation drive 98.

In this way, the second spindle 16 can move linearly along the fifth feed control axis (X3-axis) parallel to the third feed control axis (X2-axis) of the second tool rest 20. Therefore, the second tool rest 20 can select by indexing the desired tool 22 from the tools 22 of the second row mounted at the second holding portion 78 by at least one of its own X2-axis motion and X3-axis motion of the second spindle 16. Further, the second tool rest 20 can relatively move by interpolation the nose of the desired tool 22 as selected, by co-action of X3-axis motion and Z3-axis motion of the second spindle 16 in accordance with a machining program of the line-3 input to the NC unit 24, and also can move the nose by superposing Z3-axis motion of the second spindle 16 on Z2-axis motion of the second tool rest 20 itself in accordance with a machining program of the line-3 input to the NC unit 24. In this way, it is possible to machine a bar W' held in the second spindle 16 to a desired shape by a desired tool 22 selected from the second row on the second tool rest 20.

The automatic lathe 10 is configured to be able to simultaneously use as many as three tools 22 selected on the two tool rests 18 and 20 having the above configuration, under the three-line control of the NC unit 24, so as to automatically machine the bars W and W' held in the front and back spindles 14 and 16, and in particular to be able to simultaneously perform individual motions by interpolation instructed respectively to those three tools 22.

Figure 2:
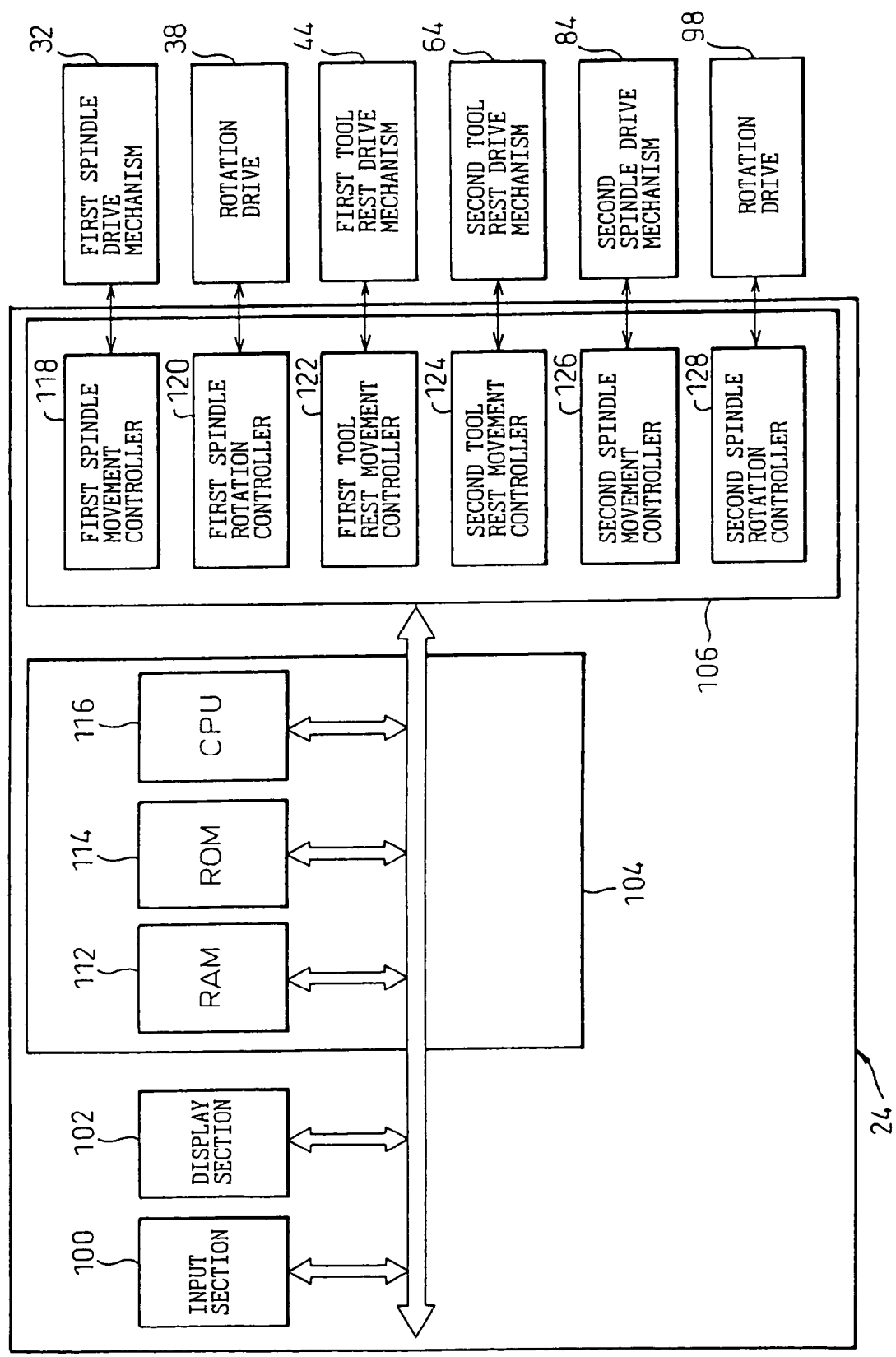
FIG. 2 is a block diagram of the configuration of an NC unit built into the NC lathe of FIG. 1.

FIG. 2 shows the configuration of the NC unit 24 for performing such diverse automatic machining. The NC unit 24 is provided with an input section 100, a display section 102, a process controlling section 104, and a servo controlling section 106. The input section 100 has a keyboard 108 with numeric keys (FIG. 1) provided at the control panel 26. Machining programs (that is, strings of blocks) relating to the tools 22, including data necessary for control of the operations of the first and second spindles 14 and 16 and first and second tool rest 18 and 20 (selection of tools, shape and dimensions of product, spindle speeds, feed speeds of tools, etc.), is input from the input section 100. The display section 102 has a CRT (cathode ray tube), LCD (liquid crystal display), or other display screen 110 (FIG. 1) provided at the control panel 26, and displays the machining programs input by the input section 100 on the display screen 110 or enables automatic programming with simulation on the display screen 110 by a conversational manner.

The process controlling section 104 has a RAM (random access memory) 112 and ROM (read only memory) 114 forming a storage section and a CPU (central processing unit) 116 forming the processing section. A plurality of machining programs relating to a plurality of tools 22 including various types of data input by the input section 100 are stored in the RAM 112 or ROM 114 under the instruction of the CPU 116. Further, the ROM 114 stores in advance control programs for driving the first and second spindles 14 and 16 and the first and second tool rests 18 and 20. The CPU 116 outputs control commands to the servo controlling section 106 based on the machining programs stored in the RAM 112 or ROM 114 and the control programs stored in the ROM 114.

The servo controlling section 106 is provided with a first spindle movement controller 118, a first spindle rotation controller 120, a first tool rest movement controller 122, a second tool rest movement controller 124, a second spindle movement controller 126, and a second spindle rotation controller 128. The first spindle movement controller 118 operates the Z1-drive 34 (FIG. 1) of the first spindle drive mechanism 32 based on the commands of the CPU 116 to move the first spindle 14 along with the first spindle stock 28 along the Z1-axis. The first spindle rotation controller 120 operates the rotation drive 38 based on the commands of the CPU 116 to rotate the first spindle 14 around the C1-axis in the first spindle stock 28. Note that high speed rotation of the first spindle 14 at the time of turning is controlled based on the speed and other data through a not shown separate control circuit.

The first tool rest movement controller 122 simultaneously operates the Y-drive 50 (FIG. 1) and X-drive 54 (FIG. 1) of the first tool rest drive mechanism 44 based on the commands of the CPU 116 to move the first tool rest 18 along the X1-axis or Y1-axis. The second tool rest movement controller 124 selectively operates the Z2-drive 70 (FIG. 1) and X2-drive 74 (FIG. 1) of the second tool rest drive mechanism 64 based on the commands of the CPU 116 to move by interpolation the second tool rest 20 in the Z2-axis motion and X2-axis motion.

The second spindle movement controller 126 selectively operates the Z3-drive 90 (FIG. 1) and X3-drive 94 (FIG. 1) of the second spindle drive mechanism 84 based on the commands of the CPU 116 to move by interpolation the second spindle 16 in the Z3-axis motion and X3-axis motion. The second spindle rotation controller 128 operates the rotation drive 98 based on the commands of the CPU 116 to rotate the second spindle 16 around the C2-axis in the second spindle stock 82. Note that high speed rotation of the second spindle 16 at the time of turning is controlled based on the speed and other data through a not shown separate control circuit.

In the above control system, the NC unit 24 functions to enable the simultaneous performance of a machining process relating to the first spindle 14 (that is, on the bar W held in the first spindle 14) by a desired tool 22 selected at the first tool rest 18, a machining process relating to the first spindle 14 by a desired tool 22 selected from the first row at the second tool rest 20, and a machining process relating to the second spindle 16 (that is, on the bar W' held in the second spindle 16) by a desired tool 22 selected from the second row at the second tool rest 20, by control of the first spindle drive mechanism 32, the first tool rest drive mechanism 44, the second tool rest drive mechanism 64, and the second spindle drive mechanism 84 in such a manner as to link them with each other. Further, the NC unit 24 can suitably control by superposition the first spindle drive mechanism 32, the first tool rest drive mechanism 44, the second tool rest drive mechanism 64, and the second spindle drive mechanism 84 so as to be able to simultaneously perform the above-described motion by interpolation in the line-1 of a tool 22 selected at the first tool rest 18, the above-described motion by interpolation in the line-2 of a tool 22 selected from the first row at the second tool rest 20, and the above-described motion by interpolation in the line-3 selected from the second row at the second tool rest 20.

Figure 3:
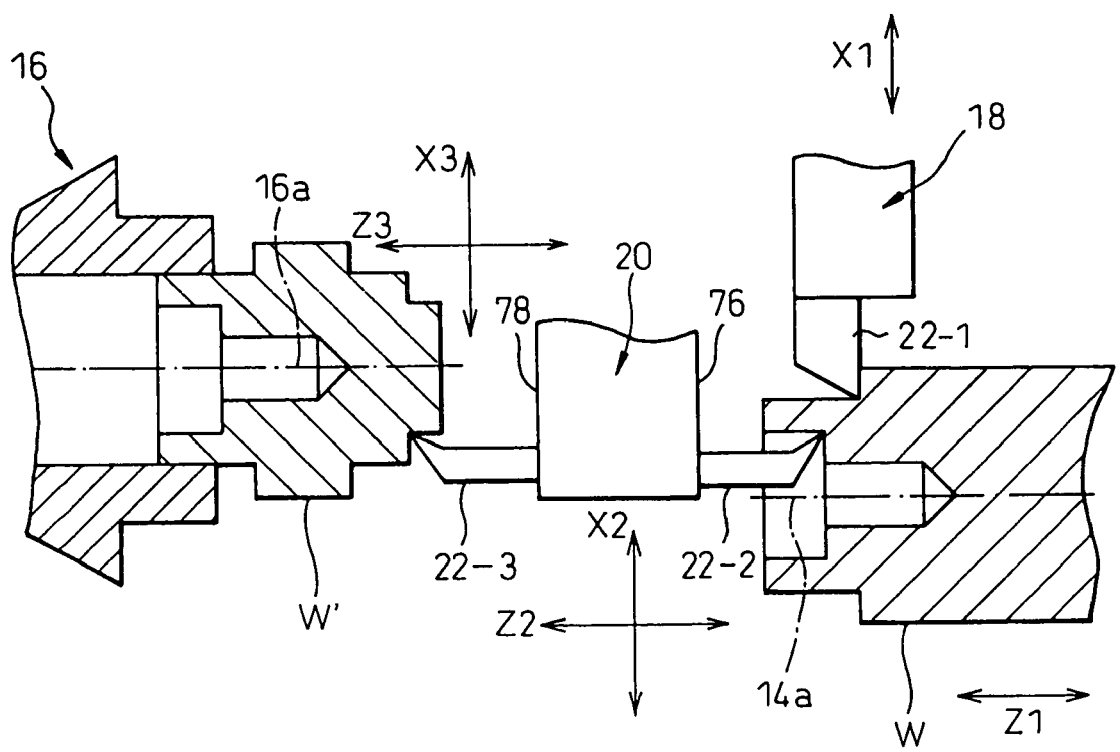
FIG. 3 is a schematic view of an example of simultaneous machining by the first and second tool rests in the NC lathe of FIG. 1.

An example of the automatic machining by such three-tool simultaneous interpolation will be explained with reference to FIG. 3. In this example, a tool 22-1 mounted at the first tool rest 18 performs outer circumferential turning on the bar W held in the first spindle 14, by motion by interpolation of Z1-axis motion of the first spindle 14 and X1-axis motion of the first tool rest 18, both belonging to the line-1 (that is, controllable by the line-1). Simultaneously, a tool 22-2 mounted at the first holding portion 76 of the second tool rest 20 performs boring on the bar W held in the first spindle 14, by motion by interpolation of Z-axis superposed motion and X2-axis motion of the second tool rest 20 belonging to the line-2 (that is, controllable by the line-2). Further, simultaneously, a tool 22-3 mounted in the second holding portion 78 of the second tool rest 20 performs outer circumferential turning on the bar W' held in the second spindle 16, by motion by interpolation of Z-axis superposed motion and X-axis superposed motion of the second spindle 16 belonging to the line-3 (that is, controllable by the line-3).

Here, the NC unit 24 controls the second tool rest drive mechanism 64 along a composite Z-axis defined by superposing the Z2-axis to which the second tool rest 20 belongs (that is, the Z2-axis for controlling the operation of the second tool rest 20) on the Z1-axis to which the first spindle 14 belongs (that is, the Z1-axis for controlling the operation of the first spindle 14) on the basis of the machining program for the tool 22-1 and the machining program for the tool 22-2, both input at the input section 100, and thereby moves the second tool rest 20 by superposition in the Z-axis direction. Similarly, the NC unit 24 controls the second spindle drive mechanism 84 along a composite Z-axis defined by superposing the Z3-axis to which the second spindle 16 belongs (that is, the Z3-axis for controlling the operation of the second spindle 16) on the Z2-axis to which the second tool rest 20 belongs and a composite x-axis defined by superposing the X3-axis to which the second spindle 16 belongs on the X2-axis to which the second tool rest 20 belongs, on the basis of the machining program for the tool 22-2 and the machining program for the tool 22-3, both input at the input section 100, and thereby moves the second spindle 16 by superposition in the Z-axis direction and moves it by superposition in the X-axis direction.

In the NC unit 24 having the above configuration, basically, the data for machining a bar W held in the first spindle 14 by the tool 22-1 mounted at the first tool rest 18 is input by the input section 100 as a machining program of the line-1 suitably combining the group of control axes (Z1-axis, X1-axis, and Y1-axis) for controlling the operations of the first spindle 14 and first tool rest 18, the data for machining a bar W held in the first spindle 14 by the tool 22-2 mounted at the first holding portion 76 of the second tool rest 20 is input by the input section 100 as a machining program of the line-2 suitably combining the group of control axes (Z1-axis, X2-axis, Z2-axis, and composite Z-axis) for controlling the operations of the first spindle 14 and second tool rest 20, and the data for machining a bar W' held in the second spindle 16 by the tool 22-3 mounted at the second holding portion 78 of the second tool rest 20 is input by the input section 100 as a machining program of the line-3 suitably combining the group of control axes (Z2-axis, X2-axis, Z3-axis, X3-axis, composite Z-axis, and composite X-axis) for controlling the operations of the second tool rest 20 and second spindle 16. These machining programs are manually input to the NC unit 24 through the keyboard 108 provided at the control panel 26 (i.e., a manual data input). The content of the programs is displayed on the display screen 110 of the display section 102 provided at the control panel 26.

Figure 4:
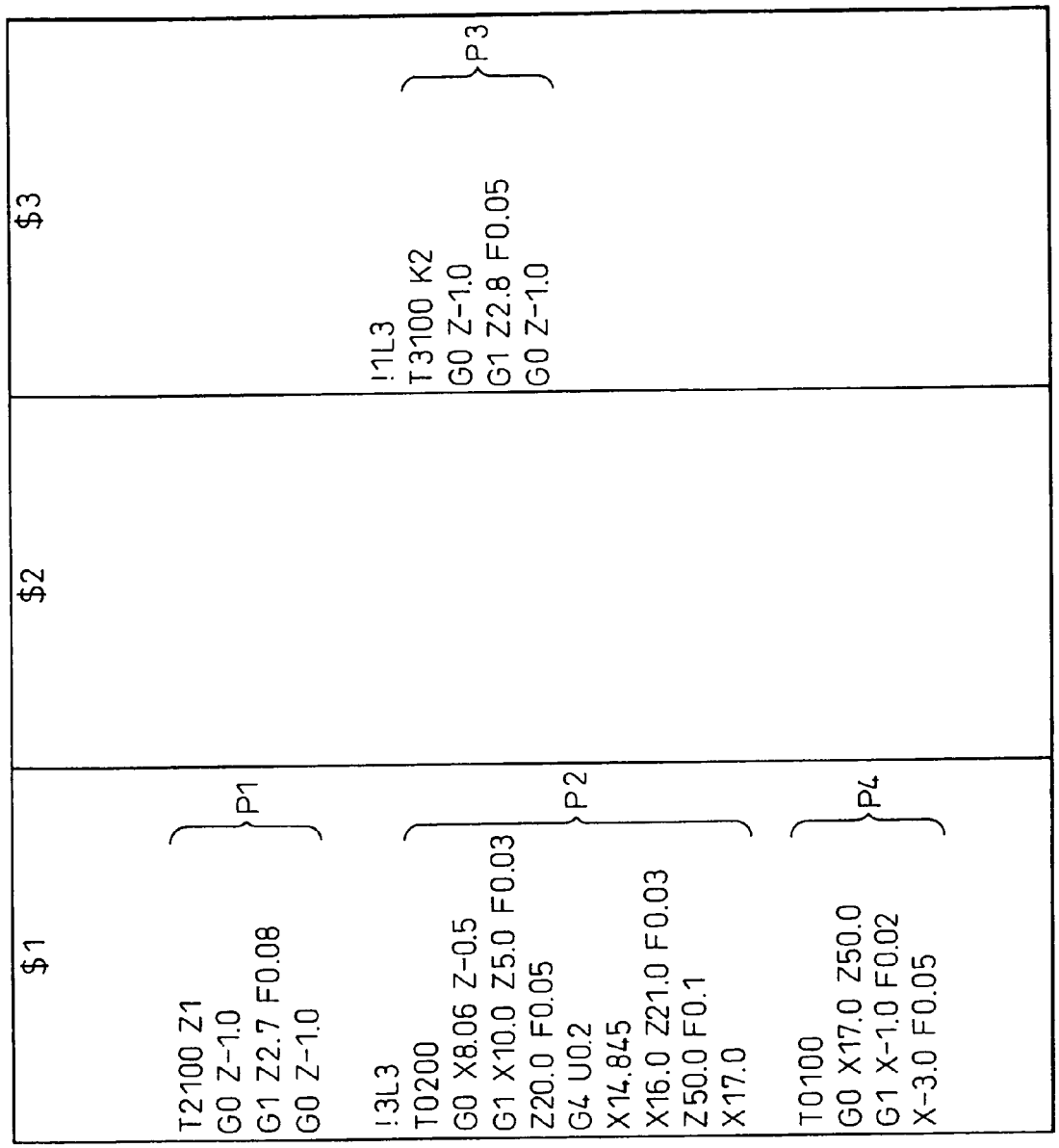
FIG. 4 is a view of an example of machining programs input and displayed in the NC unit of FIG. 2.

The RAM 112 of the NC unit 24 is provided with three program-describing areas capable of corresponding individually to the lines 1 to 3. As shown in FIG. 4, these program-describing areas are expressed demarcated from each other in parallel on the display screen 110 of the display section 102 under the symbols $1, $2 and $3. Further, a plurality of machining programs about the plurality of tools 22 on the first and second tool rests 18 and 20 can be described in a desired program-describing area or areas, freely selected from the three program-describing areas $1, $2 and $3, in the form of respective compact strings of blocks.

Here, the conventional multifunction type NC lathe had several restrictions as already described, relating to the description routine when a user prepared multi-line machining programs, such as the fact that it was only possible to describe, in the plurality of program-describing areas provided in the RAM of the NC unit, machining programs using control axes predetermined corresponding respectively to the program-describing areas. As opposed to this, the NC unit 24 of the NC lathe 10 according to the present invention possesses the following characterizing configuration for improving the freedom of the description routine when a user prepares multi-line machining programs.

That is, the NC unit 24 is configured so that the CPU 116 processes the plurality of machining programs stored in the RAM 112, so as to allocate the rectangular three-axis of X1-Y1-Z1, the rectangular two-axis of X2-Z2 and rectangular two-axis of X3-Z3 as reference control axes, respectively, to the three program-describing areas $1, $2 and $3 provided in the RAM 112, and to apply, to an actual control axis for controlling a machining operation relating to a single designated tool 22 designated in each of the machining programs, a reference control axis allocated to a program-describing area freely selected from the program-describing areas $1, $2 and $3 to describe a machining program designating this designated tool 22, then the CPU 116 outputs the control signals in accordance with these machining programs to the servo controlling section 106.

Here, the CPU 116 of the NC unit 24 may read a tool function command designating the designated tool 22 in the machining program described in the freely selected program-describing area, and decides whether the machining operation relating to the designated tool 22 can be controlled by the reference control axis applied to the actual control axis. When deciding that this machining operation cannot be controlled by the applied reference control axis, the CPU 116 applies, to the actual control axis, a control axis able to control the machining operation relating to the designated tool 22, among the control axes other than the reference control axis allocated to the freely selected program-describing area.

In this case, at the above-described step of determination of the actual control axis, the CPU 116 of the NC unit 24 can execute processing to follow an axis designation command for designating the actual control axis in the machining program described in the freely selected program-describing area, and to use the designated actual control axis instead of the applied reference control axis. Note that the actual control axis determination processing, based on the axis designation command, may also be executed as separate from the above processing for applying the reference control axis allocated to the freely selected program-describing area to the actual control axis.

Further, the CPU 116 of the NC unit 24 performs processing to determine the actual control axis for control of the machining operation relating to a single designated tool 22 designated in each of the machining programs stored in the RAM 112, in accordance with an axis superposition command for superposing a desired one of the control axes on another desired one of control axes, described together with the tool function command designating the designated tool 22 in an identical block, and then to output control signals in accordance with these machining programs to the servo controlling section 106.

The various characterizing processes regarding a program-describing routine in the NC unit 24 will be explained below with reference to the example of a machining program shown in FIGS. 4 and 5.

Figure 5:
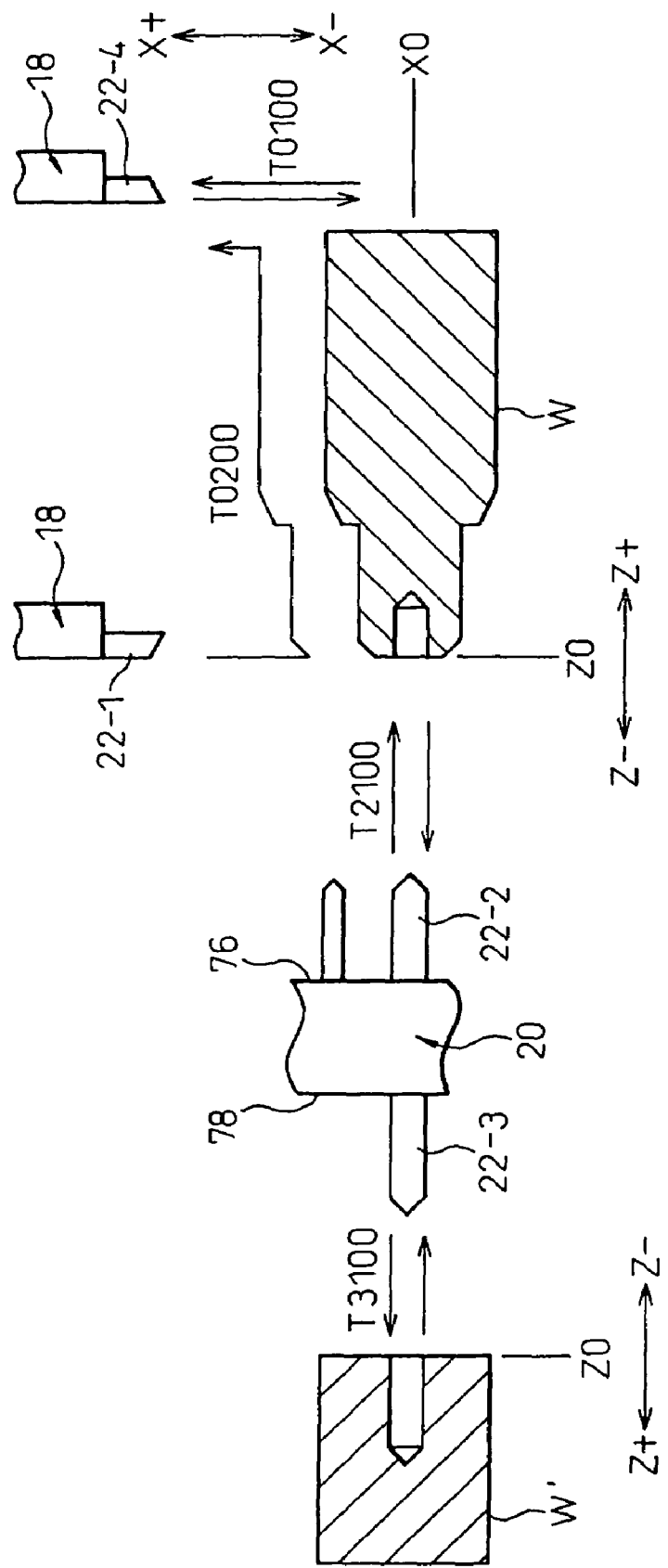
FIG. 5 is a view of a machining process performed by the machining programs of FIG. 4.

The machining program exemplary shown in FIG. 4 has a constitution that, as shown schematically in FIG. 5, firstly the tool 22-2 (tool code T2100) mounted at the first holding portion 76 of the second tool rest 20 performs end face boring on the bar W at the first spindle 14 side, by Z2-axis motion of the second tool rest 20 under control of the line-1 (program P1); secondly the tool 22-1 (tool code T0200) mounted at the first tool rest 18 performs outer circumferential turning on the bar W, by motion by interpolation between the Z1-axis motion of the first spindle 14 and X1-axis motion of the first tool rest 18 under control of the line-1 (program P2); simultaneously the tool 22-3 (tool code T3100) mounted at the second holding portion 78 of the second tool rest 20 performs end face boring on the bar W' at the second spindle 16 side, by Z2-axis motion of the second tool rest 20 under control of the line-3 (program P3); and lastly the tool 22-4 (tool code T0100) mounted at the first tool rest 18 performs cutting-off on the bar W, by the X1-axis motion of the first tool rest 18 under control of the line-1. Note that, in FIG. 5, X0 and Z0 indicate reference positions of the X-axis motion and Z-axis motion.

When the user prepares the four machining programs P1 to P4, it is possible for the user, due to the processing performed by the CPU 116 of the NC unit 24 explained above, to freely describe each of the machining programs P1 to P4 (that is, without bearing in mind the relationship between the lines corresponding to the program-describing areas $1, $2, and $3 and the control axes for controlling the machining operations relating to the designated tools 22-1 to 22-4) in any one program-describing area freely selected from the three program-describing areas $1, $2 and $3 displayed demarcated from each other in parallel on the display screen 110 of the control panel 26. In the illustrated example, the machining programs P1 (Z2-axis control), P2 (Z1-axis and X1-axis control) and P4 (X1-axis control) are described in the program-describing area $1 corresponding to the line-1, and the machining program P3 (Z2-axis control) is described in the program-describing area $3 corresponding to the line-3.

Further, when preparing machining programs, it is possible for the user to designate, as an actual control axis, a desired control axis able to control the machining operation related to a designated tool 22 in each of the machining programs. This designation can be done without regard to the selection of the program-describing areas $1, $2 and $3 for describing the machining programs P1 to P4. In the illustrated example, in the machining program P3, a block format is used, describing an axis designation command (in this exemplary program, the argument K2) for designating the Z2-axis for controlling the machining operation relating to the tool 22-3 together with the tool function command (that is, the tool code T3100) designating the tool 22-3 in an identical block. Note that as an example of describing of the argument, it is possible to use an argument In designating the Xn-axis in addition to an argument Kn designating the Zn-axis.

Further, at the time of preparing machining programs, it is possible for the user to describe a command for determining an actual control axis by superposing a desired one of control axes on another desired one of control axes, among a plurality of control axes able to control the machining operation relating to a designated tool 22 in each machining program, simultaneous with the designation of the tool 22. This superposition command can be described without regard to the selection of the program-describing areas $1, $2 and $3 describing the machining programs P1 to P4. In the illustrated example, a block format is used, where an axis superposition command (in this exemplary program, an argument Z1) for superposing the Z2-axis on the Z1-axis for controlling the machining operation relating to the tool 22-2 is described together with the tool function command (that is, the tool code T2100) designating the tool 22-2 in the machining program P1 in an identical block. Note that as an example of describing the argument, in addition to the argument Zn denoting the Zn-axis as a superposition reference, it is also possible to use an argument Xn denoting the Xn-axis as a superposition reference.

The CPU 116 processes the respective machining programs P1 to P4 described in the respective program-describing areas $1 to $3 in this way, in parallel in the three program-describing areas $1 to $3. In this respect, the machining programs P1, P2 and P4 relating to the three types of tools 22-2, 22-1 and 22-4 are described serially in the program-describing area $1, and the CPU 116 processes these machining programs P1, P2 and P4 in the same order as the describing order of the programs, and outputs control signals to the servo controlling section 106 in that order.

First, in the program-describing area $1, the CPU 116 reads the tool code T2100 described in the first block of the machining program P1, applies to the actual control axes for controlling the machining operation relating to the designated tool 22-2 the reference control axes (X1-axis, Y1-axis, Z1-axis) allocated to the program-describing area $1, and decides individually for each control axis whether the machining operation relating to the designated tool 22-2 is controllable by these reference control axes (X1-axis, Y1-axis, Z1-axis). Due to this, the X1-axis and Y1-axis are decided as reference control axes which cannot control the machining operation relating to the designated tool 22-2. Further, the CPU 116 excludes the reference control axes (X1-axis, Y1-axis) unable to control the operation from the actual control axes, and applies to the actual control axes the control axes (X2-axis, Z2-axis) able to control the machining operation relating to the designated tool 22-2 among the control axes other than those reference control axes (X1-axis, Y1-axis). As a result, a plurality of actual control axes (Z1-axis, X2-axis, Z2-axis) able to be used in the machining program P1 are selected.

Here, if only the tool code T2100 is described in this block, the CPU 116 applies with priority the reference control axes allocated to the program-describing area $1, and determines the Z1-axis and X2-axis as the actual control axes used in the machining program P1. In this case, the second tool rest 20 is not driven. As opposed to this, in the exemplary program of FIG. 4, the CPU 116 reads the argument Z1 described together in an identical block to the tool code T2100, superposes the Z2-axis, as another actual control axis, on the Z1-axis designated by this argument, and applies the resultant composite Z-axis to the actual control axis instead of the Z1-axis. As a result, the actual control axes used in the machining program P1 are determined as the composite Z-axis and X2-axis. Then, the CPU 116 defines the relative position and speed relationship of the bar W and the nose of the designated tool 22-2 based on tool movement data described in the subsequent string of blocks, and performs end face boring on the bar W. At this time, the address Z designating the control axis in each block expresses the composite Z-axis. Note that in the illustrated example, since there is no other simultaneous machining program for controlling the Z1-axis during execution of the machining program P1, the composite Z-axis becomes identical to the Z2-axis, and the second tool rest 20 is driven while the first spindle 14 is not driven.

At the next machining program P2 in the program-describing area $1, the CPU 116 reads the tool code T0200 described in the first block, applies to the actual control axes for controlling the machining operation related to the designated tool 22-1 the reference control axes (X1-axis, Y1-axis, Z1-axis) allocated to the program-describing area $1, and decides for each control axis whether it is possible to control the machining operation relating to the designated tool 22-1 by these reference control axes (X1-axis, Y1-axis, Z1-axis). In this case, since it is possible to control the machining operation relating to the designated tool 22-1 by all of the reference control axes, the CPU 116 determines these reference control axes (X1-axis, Y1-axis, Z1-axis) as the actual control axes. Therefore, the CPU 116 defines the relative position and speed relationship of the bar w and the nose of the designated tool 22-1 based on tool movement data described in the subsequent string of blocks, and performs outer circumferential turning on the bar W. At this time, the addresses X and Z designating the control axes in each block express the X1-axis and the Z1-axis, respectively.

At the next machining program P4 in the program-describing area $1, the CPU 116 reads the tool code T0100 described in the first block, applies to the actual control axes for controlling the machining operation related to the designated tool 22-4 the reference control axes (X1-axis, Y1-axis, Z1-axis) allocated to the program-describing area $1, and decides for each control axis whether it is possible to control the machining operation relating to the designated tool 22-4 by these reference control axes (X1-axis, Y1-axis, Z1-axis). In this case, since it is possible to control the machining operation relating to the designated tool 22-4 by all of the reference control axes, the CPU 116 determines these reference control axes (X1-axis, Y1-axis, Z1-axis) as the actual control axes. Therefore, the CPU 116 defines the relative position and speed relationship of the bar W and the nose of the designated tool 22-4 based on tool movement data described in the subsequent string of blocks, and performs cutting-off on the bar W. At this time, the addresses X and Z designating the control axes in each block express the X1-axis and the Z1-axis, respectively.

No machining program is described in the program-describing area $2, so the CPU 116 does not perform any processing in connection with the program-describing area $2.

In the program-describing area $3, the CPU 116 reads the tool code T3100 described in the first block of the machining program P3, applies to the actual control axes for controlling the machining operation related to the designated tool 22-3 the reference control axes (X3-axis, Z3-axis) allocated to the program-describing area $3, and decides for each control axis whether it is possible to control the machining operation relating to the designated tool 22-3 by these reference control axes (X3-axis, Z3-axis). In this case, since it is possible to control the machining operation relating to the designated tool 22-3 by all of the reference control axes, the CPU 116 determines these reference control axes (X3-axis, Z3-axis) as the actual control axes.

Here, if only the tool code T3100 is described in this block, the CPU 116 applies the reference control axes allocated to the program-describing area $3 as explained above, and determines the Z3-axis and X3-axis as the actual control axes used in the machining program P3. In this case, the second spindle 16 is driven while the second tool rest 20 is not driven. As opposed to this, in the exemplary program of FIG. 4, the CPU 116 reads the argument K2 described together in an identical block to the tool code T3100, and applies the Z2-axis defined by this argument to the actual control axis instead of the Z3-axis. As a result, the actual control axes used in the machining program P3 are determined as the Z2-axis and X3-axis. Therefore, the CPU 116 defines the relative position and speed relationship of the bar W' and the nose of the designated tool 22-3 based on tool movement data described in the subsequent string of blocks, and performs end face boring on the bar W'. At this time, the address Z designating a control axis in each block expresses the Z2-axis, and the second tool rest 20 is driven while the second spindle 16 is not driven.

Note that in the illustrated example, the above machining programs P2 and P3 synchronize the machining start timings by blocks using the specific code "!" for matching control timings between the lines. Therefore, the machining program P2 and the machining program P3 are prepared as simultaneous machining programs for the line-1 and the line-2. These machining programs P2 and P3 are, however, prepared to machine different bars W and W' by the operations of the different tool rests 18 and 20 as explained above, so can be executed even without synchronization of the machining start timings. In the illustrated example, however, the machining program P1 and the machining program P3 both control the Z2-axis, and therefore cannot perform simultaneous machining. As a result, the need arises for describing blocks including the code "!".

Figure 6:
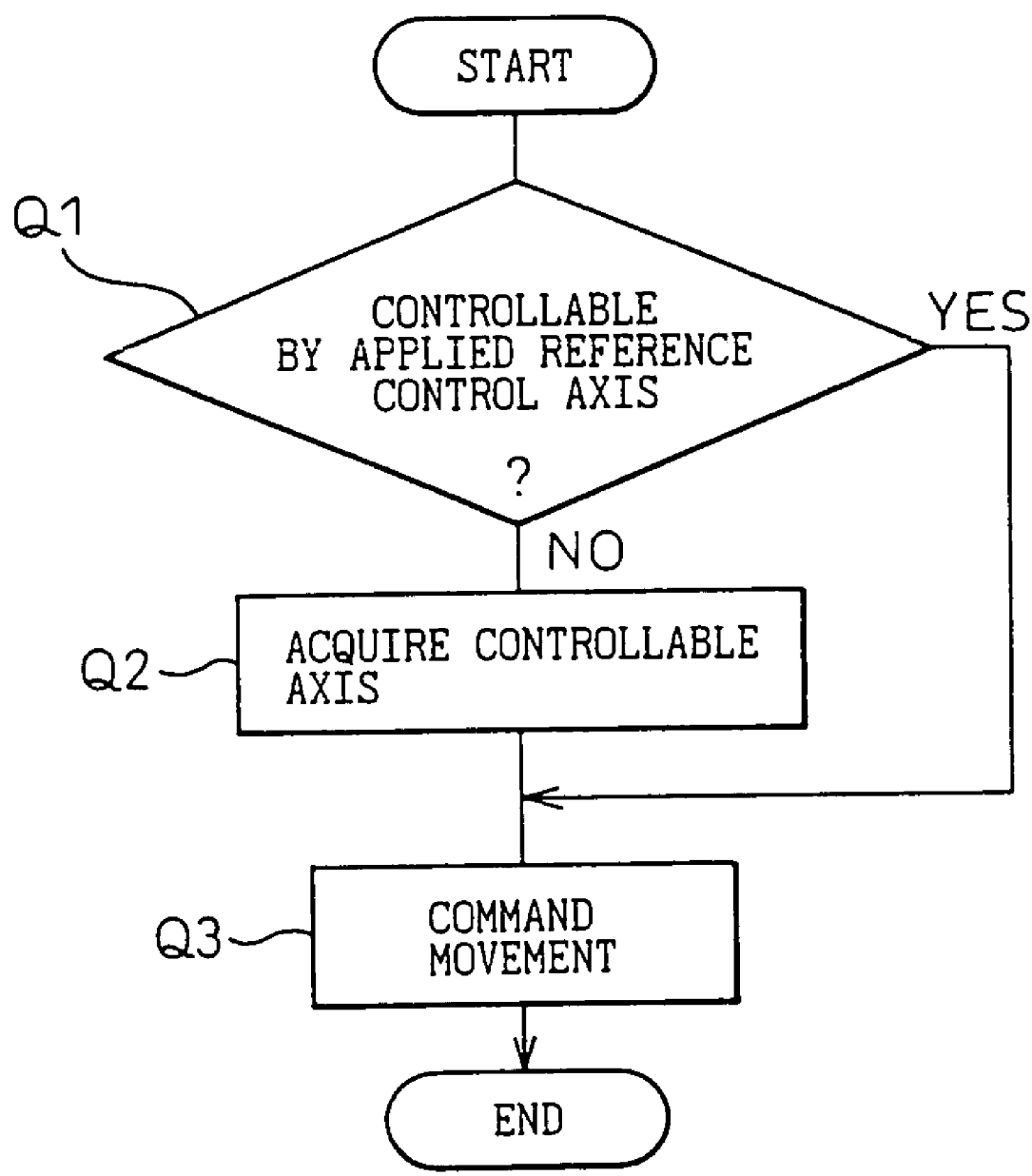
FIG. 6 is a flow chart of one processing relating to a program-describing routine in the NC unit of FIG. 2.
Figure 7:
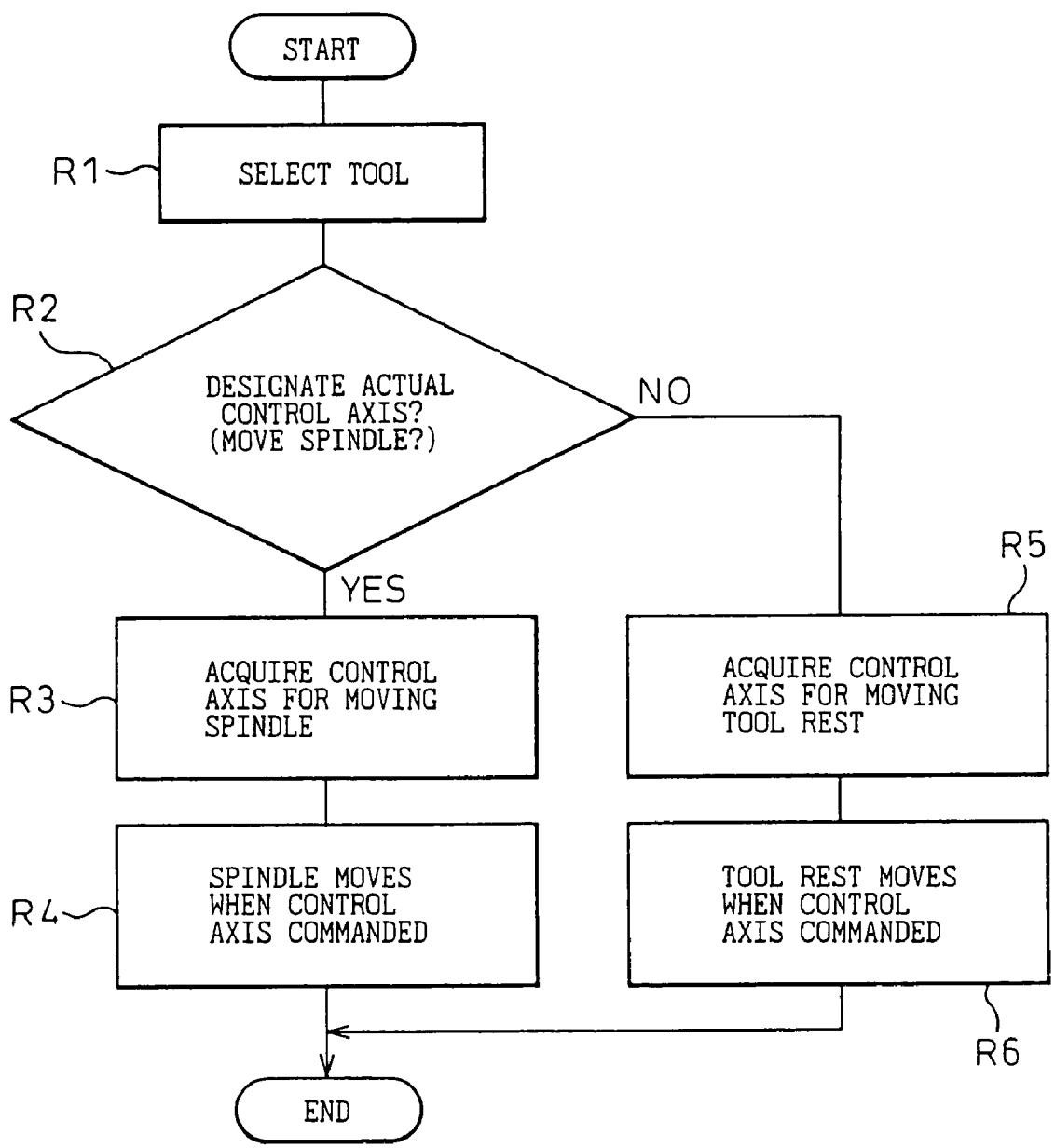
FIG. 7 is a flow chart of another routine relating to a program-describing routine in the NC unit of FIG. 2.
Figure 8:
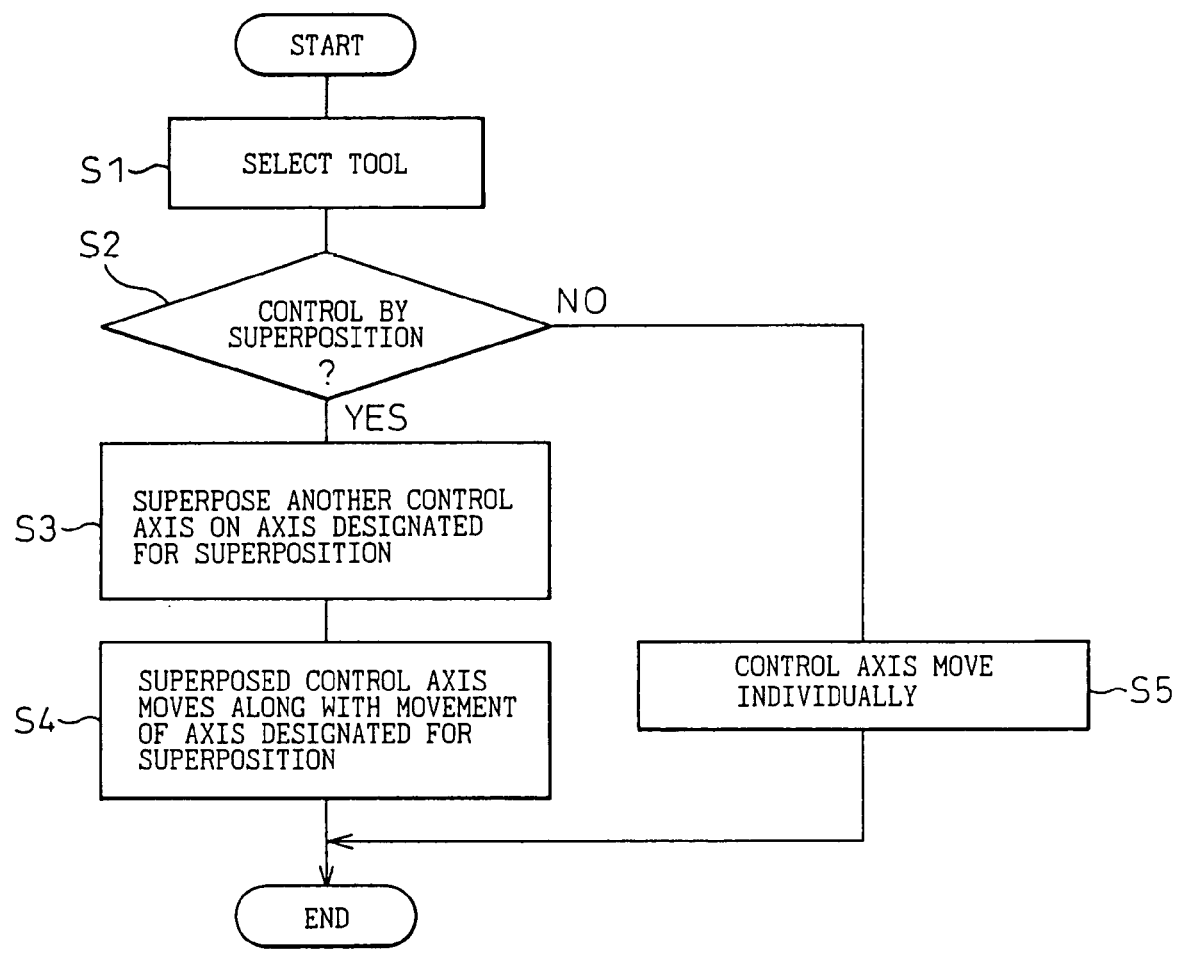
FIG. 8 is a flow chart of still another routine relating to a program-describing routine in the NC unit of FIG. 2.

The above-described various processing routines of the CPU 116 can be explained in accordance with the flow charts shown in FIGS. 6 to 8. First, as shown in FIG. 6, in the processing for applying to the actual control axis used in a machining program the reference control axis allocated to the program-describing area describing this machining program, the CPU 116 reads the tool code and thereby decides, individually for every control axis, whether the machining operation related to the designated tool is controllable by the applied reference control axis (step Q1). When deciding at step Q1 that the control by the applied reference control axis is impossible, this reference control axis is cancelled from the actual control axis, and the control axis able to control the machining operation relating to the designated tool is acquired from the other control axes to be applied to the actual control axis (step Q2). On the other hand, when deciding at step Q1 that the control by the applied reference control axis is possible, this reference control axis is directly applied to the actual control axis. Further, the processing is performed by the actual control axis as determined, and the movement command is output to the servo controlling section 106 (step Q3).

Due to this processing, it becomes possible to describe serially the machining programs using control axes of different lines in an identical program-describing area as explained above, which had been, as a common practice, describe in different program-describing areas in software of conventional NC units. Further, the CPU 116 processes these machining programs using control axes of different lines, described serially in the identical program-describing area, in the same order as the describing order of the programs, and outputs the movement commands to the servo controlling section 106 in that order.

For example, in the exemplary program of FIG. 4, the machining programs P1 and P2 operate different tool rests 18 and 20 to perform end face boring and outer circumferential turning on the same bar W. In this case, the end face boring and the outer circumferential turning normally require the rotation speeds of the bar W or the first spindle 14 different from each other, so these machining programs P1 and P2 are performed as successive machining wherein the machining order is specified, rather than simultaneous machining. At this time, with the software of conventional NC units, it was only possible to describe, in the program-describing areas set in the RAM, the machining programs using control axes determined in advance corresponding respectively to the areas, so that, in the above exemplary machining, the machining program P1 using the Z2-axis is described in the program-describing area $2, and the machining program P2 using the Z1-axis and the X1-axis is described in the program-describing area $1. In this case, to prevent the machining program P1 and the machining program P2 from being executed simultaneously at the same timing, it is necessary to designate matching of the machining start timings by blocks using a specific code "!" for matching the control timings of the lines.

As opposed to this, according to the NC unit 24 of the present invention, it is possible to merely serially describe the machining program P1 and the machining program P2, using the control axes of different lines, in the identical program-describing area $1 in accordance with the machining order, so as to perform the successive machining corresponding to the describing order. Therefore, when the user prepares successive machining programs, there is no need to understand the relative order of the various types of control operations between different lines, as well as to describe blocks using the code "!", so that the input work becomes easy and input errors due to descriptive omissions can be eliminated. Further, the effect is exhibited that the time for execution of the prepared machining programs (that is, the machining time) can be shortened by the amount of elimination of blocks using the code "!".

Next, as shown in FIG. 7, for the actual control axis determination processing based on an axis designation command, the CPU 116 selects the tool designated by the machining program (step R1), and thereafter decides whether the actual control axis for execution of this machining program is designated, by reading the argument In or Kn (step R2). Here, the NC lathe 10 can machine the bars W and W' held in the first and second spindles 14 and 16 by moving one of the second tool rest 20 and the first and second spindles 14 and 16, so that, at step R2, it is decided whether the spindle holding the bar to be machined is moved with respect to the designated tool to perform the machining. In the case where the spindle is moved, the control axis for controlling the spindle operation is acquired and applied to the actual control axis (step R3). In this state, the addresses X and Z designating the control axes are read as expressing the acquired control axis, so that, when processing the data and outputting the movement command to the servo controlling section 106, the spindle moves (step R4). On the other hand, in the case where the tool rest mounting the designated tool is moved instead of moving the spindle, the control axis for controlling the operation of the tool rest is acquired and applied to the actual control axis (step R5). In this state, when processing the tool movement data and outputting the movement command to the servo controlling section 106, the tool rest moves (step R6). Note that, when it is not possible to acquire the control axis able to execute the machining program at steps R3 and R5, it is judged that there has been an error in describing the argument In or Kn, and for example an alarm is raised.

Figure 9:
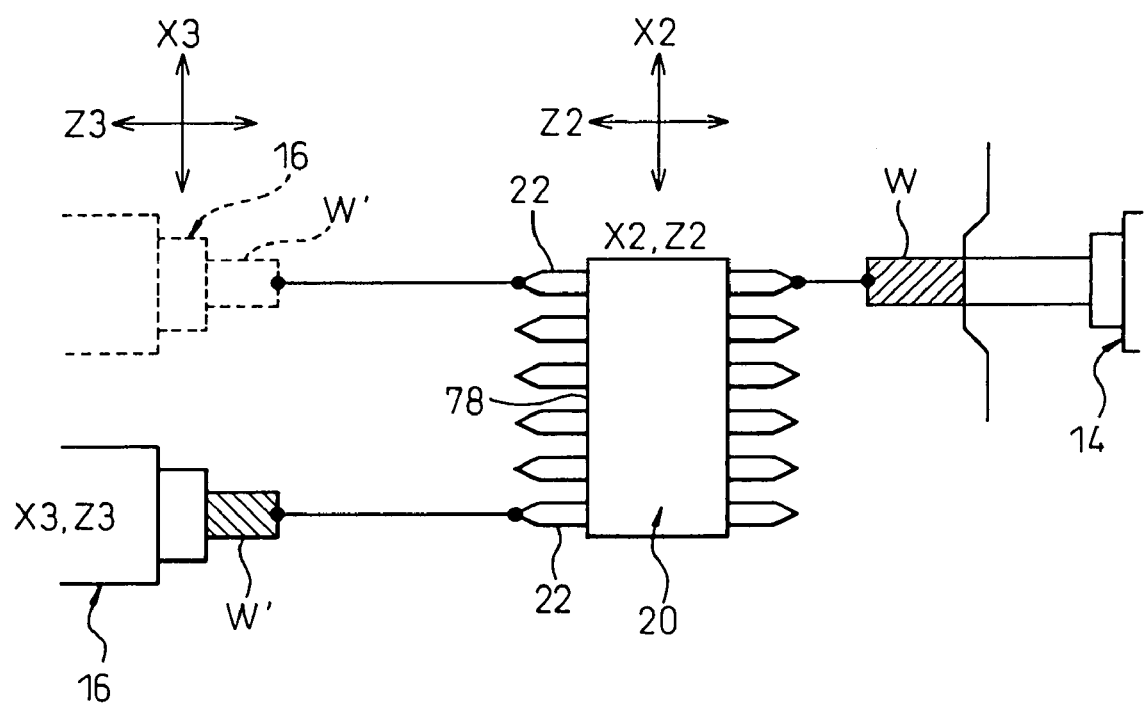
FIG. 9 is a view of an example of a machining operation according to the processing of FIG. 7.

Due to this processing, at the stage of preparing a machining program, a user has the freedom of selecting the actual control axis for control of the machining operation for each tool. In the NC lathe 10, as shown, for example, in FIG. 9, when performing the end face boring on a bar W' held in the second spindle 16 by a tool 22 mounted in the second holding portion 78 of the second tool rest 20, the user can freely designate either one of the Z2-axis and Z3-axis as an actual control axis for control of the machining operation relating to the tool 22. Therefore, for example, at the stage of preparing the program by the user, designation becomes possible for the purpose of shortening the time required for tool selection, such that, when the second spindle 16 is arranged at a position facing the first spindle 14 coaxially, the bar W' is machined by the Z2-axis motion of the second tool rest 20, while when the second spindle 16 is arranged at another position, the bar W' is machined by Z3-axis motion of the second spindle 16.

Note that in the mechanical configuration of the NC lathe 10, even when performing the end face boring on the bar W held in the first spindle 14 by a tool 22 mounted in the first holding portion 76 of the second tool rest 20, it is possible to designate either one of the Z1-axis motion of the first spindle 14 under control of the line-1 and the Z2-axis motion of the second tool rest 20 under control of the line-2. Further, when performing the outer circumferential turning or inner circumferential turning on a bar W' held in the second spindle 16 by a tool 22 mounted in the second holding portion 78 of the second tool rest 20, it is possible to designate either one of the X2-axis motion of the second tool rest 20 under control of the line-2 and X3-axis motion of the second spindle 16 under control of the line-3. Further, the arguments In and Zn are combined and described together with the tool code in a single block, instead of being independently described together with the tool code as explained above, so that the CPU 116 can execute an actual control axis determination processing under the simultaneous designation command of the X-axis and Z-axis in accordance with the above-explained flow chart.

Further, as shown in FIG. 8, for the actual control axis determination processing in accordance with the axis superposition command, the CPU 116 selects the tool designated by the machining program (step S1), and thereafter decides whether the actual control axis for execution of this machining program is determined by superposition, by reading the argument Xn or Zn (step S2). In the case where the superposition control is performed, the NC unit superposes, on the control axis designated by the argument Xn or Zn, another control axis able to execute the machining program, and applies the resultant composite axis to the actual control axis (step S3). When processing the tool movement data in this state, the movement control along the superposed control axis is also performed together with the movement control along the superposition designating axis (step S4). On the other hand, in the case where the superposition control is not performed, the movement control is performed independently for each non-composite control axis (step S5). Note that, at step S3, when another control axis cannot be superposed on the designated control axis, it is judged that there has been an error in describing the argument Xn or Zn, and for example an alarm is raised.

Due to this processing, it becomes unnecessary to provide a block, exclusively for superposition, for describing specific codes for commanding the start and end of superposition, which had been considered necessary in software of a conventional NC unit. For example, in the example of FIG. 4, when only describing the argument Z1 together with the tool code T2100 at the first block of the machining program P1, the start of the superposition of the Z1-axis and Z2-axis is designated. Further, by not describing the argument Zn together with the tool code T0200 at the initial block of the next machining program P2, the end of the superposition of the Z1-axis and the Z2-axis is designated. Therefore, when the user designates the superposition control, it is not necessary to describe the block exclusively for superposition, so that the input work becomes easy and input errors due to descriptive omissions can be eliminated. Further, the effect is exhibited that it is possible to shorten the time for executing the prepared machining programs (that is, the machining time) by the amount of elimination of the block exclusively for superposition.

Note that in the mechanical configuration of the NC lathe 10, even when the bar W held in the first spindle 13 is transferred to the second spindle 16, it is possible to move the second spindle 16 in the Z3-axis direction in the state superposing the Z3-axis on the Z1-axis. Further, even when machining a bar W' held in the second spindle 16 by a tool 22 mounted in the second holding portion 78 of the second tool rest 20, it is possible to move the second spindle 16 in the Z3-axis direction in the state superposing the Z3-axis on the Z2-axis, and possible to move the second spindle 16 in the X3-axis direction in the state superposing the X3-axis on the X2-axis. Further, it is also possible to superpose the Z3-axis motion of the second spindle 16 on the composite Z-axis obtained by superposing the Z2-axis motion of the second tool rest 20 on the Z1-axis motion of the first spindle 14. In the NC lathe 10, it is possible to perform various simultaneous machining under those various superposition control. Note that the machining program for designating these superposition controls can be described in a program-describing area freely selected from the three program-describing areas $1, $2 and $3. Further, the arguments Xn and Zn are combined and described together with the tool code in a single block, instead of being independently described together with the tool code as explained above, so that the CPU 116 can execute the actual control axis determination processing under the simultaneous superposition command of the X-axis and Z-axis in accordance with the above-explained flow chart. Further, the argument Xn and/or Zn is combined with the above-explained argument In and/or Kn for the designation of the control axis so as to be described together with the tool code in a single block, it is possible for the CPU 116 to perform the actual control axis determination processing under simultaneous commands for axis designation and axis superposition.

Figure 10:
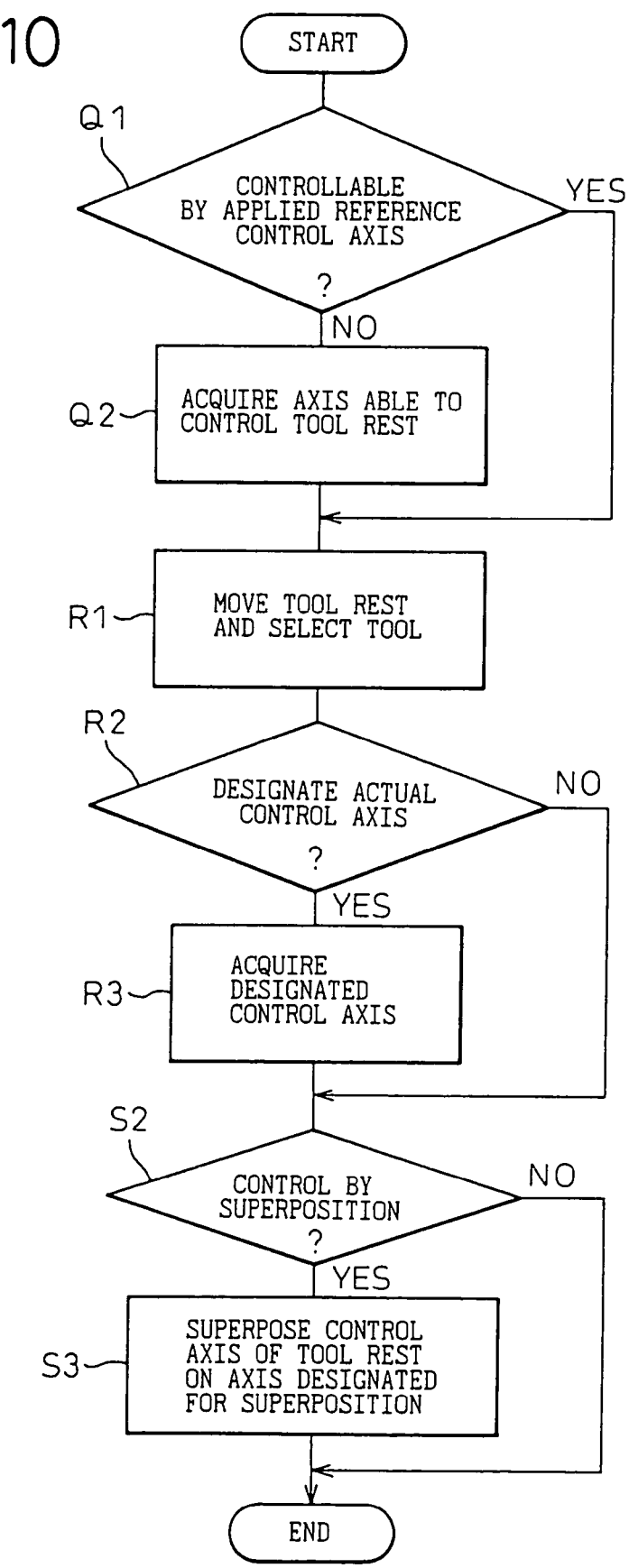
FIG. 10 is a flow chart of a tool selection routine using the processes of FIG. 6 to FIG. 8.

The NC unit according to the present invention can also be configured to complete the tool selection and actual control axis determination processing as the first stage of the machining program, by having the CPU subsequently perform the above various processings. FIG. 10 shows the flow chart for tool selection. First, at the above-explained step Q1, the CPU decides whether it is possible to control the machining operation relating to a designated tool by applied reference control axis, and when deciding uncontrollable, the control axis able to move the tool rest mounting the designated tool is acquired at step Q2. Next, at step R1, this tool rest is moved to select the designated tool, thereafter the CPU decides whether the actual control axis for executing the machining program is designated at step R2, and when deciding designation, the designated actual control axis is acquired at step R3. Next, at step S2, the CPU decides whether the actual control axis for executing the machining program is determined by superposition, and when deciding superposition controlling, another control axis able to move the tool rest mounting the designated tool is superposed on the designated control axes at step S3. In this way, the tool selection and the actual control axis determination processing are finished.

While preferred embodiments of the present invention were explained above, the present invention is not limited to the above embodiments and can be changed and modified in various ways within the scope of the claims. For example, the NC lathe, NC unit, method of control and method of programming, according to the present invention, are not limited to the above three-line control configuration and can be applied to a multi-line control configuration having various other configurations such as two-line or four-line configuration.

The invention claimed is:

1. A numerically controlled lathe comprising:
   a lathe bed;
   at least one spindle installed on said lathe bed;
   at least one tool rest installed on said lathe bed; and
   a control unit for controlling operations of said at least one spindle and said at least one tool rest on said lathe bed along a plurality of control axes in a plurality of lines;
   wherein said control unit comprises:
   an input section for inputting a plurality of machining programs about a plurality of tools mounted in said at least one tool rest;
   a storage section including a plurality of program-describing areas individually corresponding to said plurality of lines, for describing and storing said plurality of machining programs input by said input section in said plurality of program-describing areas; and
   a processing section for allocating said plurality of control axes to said plurality of program-describing areas in said storage section, each of said control axes being as a reference control axis, and for applying, to an actual control axis for controlling a machining operation relating to one designated tool designated in each of said plurality of machining programs, said reference control axis allocated to a program-describing area freely selected from said plurality of program-describing areas to describe a machining program designating said designated tool; and
   wherein each of said plurality of machining programs are able to be described in a desired program-describing area freely selected from said plurality of program-describing areas.

2. A numerically controlled lathe as set forth in claim 1, wherein said processing section of said control unit reads a tool function command designating said designated tool in said machining program described in said program-describing area as freely selected, and decides whether said machining operation relating to said designated tool is controllable by said reference control axis as applied.

3. A numerically controlled lathe as set forth in claim 2, wherein, when deciding that said machining operation relating to said designated tool is not controllable by said reference control axis as applied, said processing section of said control unit applies, to said actual control axis, a control axis capable of controlling said machining operation relating to said designated tool among said plurality of control axes other than said reference control axis allocated to said program-describing area as freely selected.

4. A numerically controlled lathe as set forth in claim 1, wherein said processing section of said control unit follows an axis designation command designating said actual control axis in said machining program described in said program-describing area as freely selected, and uses said actual control axis as designated, instead of said reference control axis as applied.

5. A numerically controlled lathe as set forth in claim 4, wherein a tool function command designating said designated tool and said axis designation command are described together in an identical block in said machining program described in said program-describing area as freely selected.

6. A numerically controlled lathe as set forth in claim 1, wherein said processing section of said control unit determines said actual control axis in accordance with an axis superposition command for superposing a desired one of said control axes on another desired one of said control axes, described together with a tool function command designating said designated tool in an identical block, in said machining program described in said program-describing area as freely selected.

7. A numerically controlled lathe as set forth in claim 1, wherein said processing section of said control unit processes a plurality of machining programs about a plurality of tools, described in series in said program-describing area as freely selected, in such a manner as to perform the programs in an order matching a describing order of the programs.

8. A control unit for use in a numerically controlled lathe having a plurality of lines including a plurality of control axes, comprising:
an input section for inputting a plurality of machining programs about a plurality of tools provided in said numerically controlled lathe;
a storage section including a plurality of program-describing areas individually corresponding to said plurality of lines, for describing and storing said plurality of machining programs input by said input section in said plurality of program-describing areas; and
a processing section for allocating said plurality of control axes to said plurality of program-describing areas in said storage section, each of said control axes being as a reference control axis, and for applying, to an actual control axis for controlling a machining operation relating to one designated tool designated in each of said plurality of machining programs, said reference control axis allocated to a program-describing area freely selected from said plurality of program-describing areas to describe a machining program designating said designated tool; and
wherein each of said plurality of machining programs are able to be described in a desired program-describing area freely selected from said plurality of program-describing areas.

9. A control unit as set forth in claim 8, wherein said processing section reads a tool function command designating said designated tool in said machining program described in said program-describing area as freely selected, and decides whether said machining operation relating to said designated tool is controllable by said reference control axis as applied.

10. A control unit as set forth in claim 9, wherein, when deciding that said machining operation relating to said designated tool is not controllable by said reference control axis as applied, said processing section applies, to said actual control axis, a control axis capable of controlling said machining operation relating to said designated tool among said plurality of control axes other than said reference control axis allocated to said program-describing area as freely selected.

11. A control unit as set forth in claim 8, wherein said processing section follows an axis designation command designating said actual control axis in said machining program described in said program-describing area as freely selected, and uses said actual control axis as designated, instead of said reference control axis as applied.

12. A control unit as set forth in claim 11, wherein a tool function command designating said designated tool and said axis designation command are described together in an identical block in said machining program described in said program-describing area as freely selected.

13. A control unit as set forth in claim 8, wherein said processing section determines said actual control axis in accordance with an axis superposition command for superposing a desired one of said control axes on another desired one of said control axes, described together with a tool function command designating said designated tool in an identical block, in said machining program described in said program-describing area as freely selected.

14. A control unit as set forth in claim 8, wherein said processing section processes a plurality of machining programs about a plurality of tools, described in series in said program-describing area as freely selected, in such a manner as to perform the programs in an order matching a describing order of the programs.

15. A method of control of a numerically controlled lathe including at least one spindle and at least one tool rest, which are operable under control along a plurality of control axes in a plurality of lines, comprising:
providing a control unit comprising a storage section including a plurality of program-describing areas individually corresponding to said plurality of lines;
allocating said plurality of control axes to said plurality of program-describing areas in said storage section of said control unit, each of said control axes being as a reference control axis;
describing and storing each of a plurality of machining programs about a plurality of tools carried on said at least one tool rest, in a desired program-describing area freely selected from said plurality of program-describing areas in said storage section of said control unit;
applying, to an actual control axis for controlling a machining operation relating to one designated tool designated in each of said plurality of machining programs, said reference control axis allocated to said desired program-describing area as freely selected to describe a machining program designating said designated tool; and controlling an operation of each of said at least one spindle and said at least one tool rest along said reference control axis applied to said actual control axis in each of said plurality of machining programs.

16. A method of control as set forth in claim 15, wherein the step of applying said reference control axis to said actual control axis includes reading a tool function command designating said designated tool in said machining program described in said program-describing area as freely selected, and deciding whether said machining operation relating to said designated tool is controllable by said reference control axis as applied.

17. A method of control as set forth in claim 16, including, when deciding that said machining operation relating to said designated tool is not controllable by said reference control axis as applied, applying, to said actual control axis, a control axis capable of controlling said machining operation relating to said designated tool among said plurality of control axes other than said reference control axis allocated to said program-describing area as freely selected.

18. A method of control as set forth in claim 15, wherein the step of applying said reference control axis to said actual control axis includes, in accordance with an axis designation command designating said actual control axis in said machining program described in said program-describing area as freely selected, using said actual control axis as designated, instead of said reference control axis as applied.

19. A method of control as set forth in claim 18, wherein a tool function command designating said designated tool and said axis designation command are described together in an identical block in said machining program described in said program-describing area as freely selected.

20. A method of control as set forth in claim 15, wherein the step of applying said reference control axis to said actual control axis includes determining said actual control axis in accordance with an axis superposition command for superposing a desired one of said control axes on another desired one of said control axes, described together with a tool function command designating said designated tool in an identical block, in said machining program described in said program-describing area as freely selected.

21. A method of describing of a machining program in a control unit in a numerically controlled lathe provided with a plurality of lines including a plurality of control axes, comprising:

setting a plurality of program-describing areas individually corresponding to said plurality of lines in a storage section of said control unit, said control axes being allocated to said plurality of program-describing areas, each of said control axes being as a reference control axis; and describing each of a plurality of machining programs about a plurality of tools, in connection with a desired program-describing area freely selected from said plurality of program-describing areas in said storage section of said control unit, by using a block format for applying said reference control axis, allocated to said desired program-describing area as freely selected, to an actual control axis for controlling a machining operation relating to one designated tool designated in each machining program.

22. A method of describing as set forth in claim 21, wherein said block format includes a tool function command designating said designated tool.

23. A method of describing as set forth in claim 21, wherein said block format includes an axis designation command for designating said actual control axis to be used instead of said reference control axis as specified.

24. A method of describing as set forth in claim 23, wherein a tool function command designating said designated tool and said axis designation command are described together in an identical block.

25. A method of describing as set forth in claim 21, wherein said block format includes an axis superposition command for superposing a desired one of said control axes on another desired one of said control axes, described together with a tool function command designating said designated tool in an identical block.

26. A numerically controlled lathe comprising:

a lathe bed;

a first spindle installed on said lathe bed, including a first axis of rotation, and movable under control along a first control axis in a first line;

a first tool rest installed on said lathe bed and movable under control along a second control axis in said first line;

a second tool rest installed on said lathe bed and movable under control along third and fourth control axes in a second line;

a second spindle installed on said lathe bed, including a second axis of rotation parallel to said first axis of rotation, and movable under control along fifth and sixth control axes in a third line; and a control unit comprising a storage section including first, second, and third program-describing areas to which said first to sixth control axes are allocated, each of said control axes being as a reference control axis, said control unit capable of describing each of a plurality of machining programs about a plurality of tools carried on said first and second tool rests, in connection with a desired program-describing area freely selected from said first to third program-describing areas, by using a block format for applying, to an actual control axes for controlling a machining operation relating to one designated tool designated in each machining program, said reference control axis allocated to said desired program-describing area as freely selected.

27. A numerically controlled lathe as set forth in claim 26, wherein said second tool rest is capable of holding said plurality of tools in parallel arrangements along a first row and a second row, exhibiting mutually different nose orientations.

* * * * *